(12) United States Patent
Poppe et al.

(10) Patent No.: US 12,234,372 B2
(45) Date of Patent: Feb. 25, 2025

(54) POLYCARBOXYLIC ACID-CONTAINING AQUEOUS COATING AGENT HAVING AN IMPROVED EFFECT PIGMENT ALIGNMENT

(71) Applicant: BASF Coatings GmbH, Münster (DE)

(72) Inventors: Andreas Poppe, Muenster (DE); Katrin Deller, Muenster (DE); Klaus Eikelmann, Wuerzburg (DE); Dominik Stoll, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 771 days.

(21) Appl. No.: 17/425,073

(22) PCT Filed: Jan. 13, 2020

(86) PCT No.: PCT/EP2020/050666
§ 371 (c)(1),
(2) Date: Jul. 22, 2021

(87) PCT Pub. No.: WO2020/151977
PCT Pub. Date: Jul. 30, 2020

(65) Prior Publication Data
US 2022/0098435 A1 Mar. 31, 2022

(30) Foreign Application Priority Data
Jan. 23, 2019 (EP) ...................................... 19153289

(51) Int. Cl.
| | | |
|---|---|---|
| *C09D 175/04* | (2006.01) | |
| *B05D 5/06* | (2006.01) | |
| *B05D 7/00* | (2006.01) | |
| *C08K 3/08* | (2006.01) | |
| *C08K 5/092* | (2006.01) | |
| *C09D 5/44* | (2006.01) | |
| *C09D 7/20* | (2018.01) | |
| *C09D 7/63* | (2018.01) | |
| *C09D 175/02* | (2006.01) | |

(52) U.S. Cl.
CPC ........... *C09D 175/04* (2013.01); *B05D 5/068* (2013.01); *B05D 7/532* (2013.01); *B05D 7/57* (2013.01); *C08K 3/08* (2013.01); *C08K 5/092* (2013.01); *C09D 5/4465* (2013.01); *C09D 5/4492* (2013.01); *C09D 7/20* (2018.01); *C09D 7/63* (2018.01); *C09D 175/02* (2013.01); *B05D 2401/21* (2013.01); *B05D 2425/02* (2013.01); *B05D 2503/00* (2013.01); *C08K 2003/0812* (2013.01)

(58) Field of Classification Search
CPC ................................ C08K 5/092; C08K 5/098
See application file for complete search history.

(56) References Cited

U.S. PATENT DOCUMENTS

| | | |
|---|---|---|
| 5,334,420 A | 8/1994 | Hartung et al. |
| 5,601,880 A | 2/1997 | Schwarte et al. |
| 6,129,989 A | 10/2000 | Sapper |
| 6,737,468 B1 | 5/2004 | Bremser |
| 7,591,120 B2 | 9/2009 | Hafker et al. |
| 2008/0220173 A1 | 9/2008 | Poppe et al. |
| 2011/0042623 A1 | 2/2011 | Lueer et al. |
| 2011/0059251 A1 | 3/2011 | Poppe et al. |
| 2015/0344716 A1 | 12/2015 | Kroell et al. |
| 2017/0267875 A1 | 9/2017 | Corten et al. |
| 2018/0002476 A1 | 1/2018 | Reuter et al. |
| 2018/0346740 A1* | 12/2018 | Andersen ............. C08G 18/758 |
| 2020/0102462 A1 | 4/2020 | Wilm et al. |
| 2020/0199398 A9 | 6/2020 | Corten et al. |

FOREIGN PATENT DOCUMENTS

| | | |
|---|---|---|
| CA | 3029921 A1 | 1/2018 |
| CN | 102190952 A | 9/2011 |
| DE | 4009858 A1 | 10/1991 |
| DE | 19930665 A1 | 1/2001 |
| EP | 0877063 A2 | 11/1998 |
| EP | 1153989 A1 | 11/2001 |
| EP | 1655353 A1 | 5/2006 |
| EP | 457961 A1 | 5/2012 |
| EP | 3183303 A1 | 6/2017 |
| JP | 2000501993 A | 2/2000 |
| JP | 2007506621 A | 3/2007 |
| JP | 2018031099 A | 3/2018 |
| WO | 9115528 A1 | 10/1991 |
| WO | 0022050 A1 | 4/2000 |
| WO | 2006042585 A1 | 4/2006 |
| WO | 2008074490 A1 | 6/2008 |
| WO | 2009077182 A1 | 6/2009 |
| WO | 2009100938 A1 | 8/2009 |
| WO | 2011075718 A1 | 6/2011 |
| WO | 2014033135 A2 | 3/2014 |

(Continued)

OTHER PUBLICATIONS

International Search Report for corresponding PCT/EP2020/050666 mailed Mar. 24, 2020, 3 Pages.

(Continued)

*Primary Examiner* — Wenwen Cai
(74) *Attorney, Agent, or Firm* — Armstrong Teasdale LLP

(57) ABSTRACT

Described herein are an aqueous coating composition including at least one anionically stabilized binder, effect pigment, polycarboxylic acid, and solvent, and a method for producing a multicoat paint system by producing a basecoat directly on a substrate, producing a clearcoat directly on the basecoat, and then jointly curing the basecoat and the clearcoat. At least one of the basecoat materials includes the aqueous coating. Also described herein are multicoat paint system obtainable by this method, and the use of at least one polycarboxylic acid in an aqueous coating composition for improving the effect pigment orientation, or for color matching.

16 Claims, No Drawings

(56) References Cited

FOREIGN PATENT DOCUMENTS

| WO | 2016091546 A1 | 6/2016 |
| WO | 2016177514 A1 | 11/2016 |
| WO | 2017088988 A1 | 6/2017 |
| WO | 2018011311 A1 | 1/2018 |
| WO | 2018172475 A1 | 9/2018 |

OTHER PUBLICATIONS

European Search Report for EP Patent Application No. 19153289.4, Issued on Jul. 17, 2019, 03 pages.

* cited by examiner

POLYCARBOXYLIC ACID-CONTAINING AQUEOUS COATING AGENT HAVING AN IMPROVED EFFECT PIGMENT ALIGNMENT

CROSS-REFERENCE TO RELATED APPLICATIONS

This application is a U.S. National Phase Application of International Patent Application No. PCT/EP2020/050666, filed Jan. 13, 2020, which claims priority to European Patent Application No. 19153289.4, filed Jan. 23, 2019, each of which is hereby incorporated by reference herein.

The present invention relates to an aqueous coating composition comprising at least one anionically stabilized binder BM, at least one effect pigment EP, at least one polycarboxylic acid PC, and at least one solvent L. The present invention further relates to a method for producing a multicoat paint system by producing a basecoat or two or more directly consecutive basecoats directly on a substrate optionally coated with a first coat, producing a clearcoat directly on the basecoat or on the topmost of the two or more basecoats, and then jointly curing the one or more basecoats and the clearcoat. At least one of the basecoat materials comprises the aqueous coating composition of the invention and/or an aqueous coating composition which has been mixed shortly before application with at least one polycarboxylic acid PC. Moreover, the present invention relates to a multicoat paint system obtainable by the method of the invention. Furthermore, the present invention relates to the use of at least one polycarboxylic acid PC in an aqueous coating composition comprising at least one anionically stabilized binder BM and at least one effect pigment EP for improving the effect pigment orientation, the improvement being achieved relative to aqueous coating compositions free from polycarboxylic acid. Last, the present invention relates to the use of at least one polycarboxylic acid PC in an aqueous coating composition comprising at least one binder BM and at least one effect pigment EP for color matching.

PRIOR ART

Particularly in automotive finishing, but also in other sectors where there is a desire for coatings with high decorative effect and at the same time effective protection from corrosion, it is known practice to provide substrates with a plurality of coating films disposed one above another.

Multicoat paint systems are applied preferably by what is called the "wet-on-wet" method, meaning that a pigmented basecoat material is applied first and is recoated, after a short flashing time, without a baking step, with clearcoat material. Subsequently, basecoat and clearcoat are jointly baked.

The "wet-on-wet" method has acquired particular significance in the application of automotive metallic effect paints.

Economic and environmental reasons have dictated the use, in the production of multicoat systems, of aqueous basecoating compositions. The coating compositions for producing these basecoats must be capable of being processed by the nowadays customary, rational "wet-on-wet" method; that is, following a very short initial drying period, without a baking step, they must be capable of being recoated with a transparent topcoat, without exhibiting defects in their visual appearance, such as, for example, those known as "pinholes".

Furthermore, the coating composition must also exhibit sufficient stability on storage. A customary test is the storage of the material at 40° C.

With metallic effect paints for use in the "wet-on-wet" method, moreover, there are further problems that must be solved. The metallic effect is critically dependent on the dispersing of the metallic pigment particles in the coating composition, the size and shape of the metallic pigment particles, rheological properties of the coating composition, application of the coating composition, and the orientation of the metallic pigment particles in the coating film. A metallic effect basecoat material which can be processed by the "wet-on-wet" method, accordingly, must provide coating films in which the metallic pigments, following application, are present in a favorable spatial orientation, and in which this orientation is fixed so quickly that it can no longer be negatively influenced in the course of the further finishing operation.

Suitable parameters for characterizing a metallic effect basecoat are the light reflection, the lightness of the hue, and the assessment of the cloudiness of the resultant finish. The change in the light reflection is also referred to as the flop index. Metallic effect basecoats exhibiting a low flop index appear uniform when viewed from several angles and on curved surfaces.

To achieve a low flop index, the metallic effect pigments must exhibit a random orientation within the basecoat. Recent times have seen an increase in the popularity of metallic effect basecoats featuring a high flop index. Coats of this kind take on different appearances when viewed from different angles and on curved surfaces. To achieve a high flop index, the metallic effect pigments within the basecoat must exhibit a substantially parallel orientation to the underlying substrate.

One way of achieving a high flop index is to apply a composition containing metallic effect pigment, with a low nonvolatile fraction, by hand. Application by hand, however, limits the use of such compositions in vehicle production and OEM vehicle finishing.

Also known from the prior art is the practice of raising the flop index by adding polyamide waxes with different acid numbers. For example, EP 0 877 063 A2, WO 2009/100938A1, EP 2 457 961 A1, and EP 3 183 303 A1 describe aqueous coating compositions which comprise a polyamide having an acid number of 30 mg KOH/g polyamide or of <10 mg KOH/g polyamide. The use of polyamides and also other water-insoluble constituents in aqueous coating compositions, however, can lead to incompatibility between these compounds and the water-soluble constituents of the compositions. This results in particular in bittiness on processing by the "wet-on-wet" method and/or on incorporation of the polyamide into the coating compositions, and/or in inadequate storage stability (demixing or phase separation) of such coating compositions, particularly at relatively high temperatures such as, for example, temperatures 40° C. On addition of polyamides, moreover, there may be poor leveling and/or a poor appearance.

EP 1 153 989 A1 discloses aqueous coating compositions which comprise a polyamide having an acid number ≥30 mg KOH/g polyamide and also, as a further rheological assistant, a metal silicate consisting of very small, usually nanoscale, particles. A disadvantage of the presence of such a metal silicate, however, especially in combination with a polyamide having an acid number >30 mg KOH/g polyamide, in aqueous coating compositions may often be the incidence of pinholes and/or pops in the case of processing by means of the "wet-on-wet" method. Furthermore, the use of metal silicates is undesirable, since on account of their high surface area they enter into strong interactions with other formulation constituents, especially dispersing additives and/or binders having groups with pigment affinity. Minimizing these interactions requires a high level of dilution. That dilution, however, may negatively influence, in particular, the shear stability and the circulation line stability of the coating composition.

Of advantage accordingly would be an aqueous coating composition comprising metallic effect pigment that exhibits a high flop index, good optical and coloristic properties, and good leveling, while being substantially free from polyamides and/or metal silicates. It would also be of advantage for the composition to be suitable for processing by the "wet-on-wet" method and to have high stability in storage.

Object and Achievement

The object of the present invention, accordingly, was that of providing an aqueous coating composition comprising metallic effect pigment and exhibiting a high flop index even without use of polyamides and/or metal silicates. Moreover, the aqueous coating composition is to have good optical and coloristic properties, good leveling, and a high stability in storage. Furthermore, the aqueous coating composition is also to be able to be used for producing multicoat paint systems by means of the "wet-on-wet" method without any adverse impact on the high flop index and on the good optical and coloristic properties and also the leveling.

Achievement of the Object

The objects described above are achieved by the subject matter claimed in the claims and also by the preferred embodiments of that subject matter that are described in the description hereinafter.

A first subject of the present invention is therefore an aqueous coating composition comprising
 (a) at least one anionically stabilized binder BM,
 (b) at least one effect pigment EP,
 (c) at least one polycarboxylic acid PC, and
 (d) at least one solvent L.

The above-specified aqueous coating composition is hereinafter also referred to as coating composition of the invention and accordingly is a subject of the present invention. Preferred embodiments of the coating composition of the invention are apparent from the description hereinafter and also from the dependent claims.

The coating composition of the invention features a high flop index even without the addition of polyamides and/or metal silicates, more particularly without the addition of polyamides and metal silicates. This high flop index is achieved through the use of at least one polycarboxylic acid PC in combination with at least one solvent L and an anionically stabilized binder BM. In combination with the anionically stabilized binder BM, the polycarboxylic acid PC gives the metallic effect pigments within the basecoat a substantially parallel orientation to the underlying substrate. The use of the solvent L allows the polycarboxylic acid PC to be incorporated homogeneously into the aqueous coating composition, so preventing the incidence of bittiness and achieving high stability in storage. In accordance with the invention it is also possible for the polycarboxylic acid PC to be dissolved in the solvent L before being added to the aqueous coating composition. This solution has a high stability in storage and can therefore be incorporated, as a storage-stable intermediate, into the production operation in a simple way as part of the production of the aqueous coating composition. Moreover, neither the addition of the polycarboxylic acid PC nor that of the solvent L leads to any adverse impact on the leveling or else on the optical or coloristic properties of the coating material films produced with the composition of the invention. In spite of the addition of the polycarboxylic acid PC, moreover, high solids contents can be realized for the coating composition of the invention.

A further subject of the present invention is a method for producing a multicoat paint system by producing a basecoat or two or more directly consecutive basecoats directly on a substrate optionally coated with a first coat, producing a clearcoat directly on the basecoat or the topmost of the two or more basecoats, and subsequently carrying out joint curing of the one or more basecoats and the clearcoat. At least one of the basecoat materials is the aqueous coating composition of the invention and/or an aqueous coating composition, comprising at least one anionically stabilized binder BM and at least one effect pigment EP, which is mixed directly before application with at least one polycarboxylic acid PC and at least one solvent.

Yet a further subject of the present invention is a multicoat paint system which is obtainable by the method of the invention.

A subject of the present invention, furthermore, is the use of at least one polycarboxylic acid PC in an aqueous coating composition, comprising at least one binder BM and at least one effect pigment EP for improving the effect pigment orientation, the improvement being achieved relative to aqueous coating compositions free from polycarboxylic acid.

A final subject of the present invention is the use of at least one polycarboxylic acid PC in an aqueous coating composition comprising at least one binder BM and at least one effect pigment EP for color matching.

DETAILED DESCRIPTION

Definitions

A number of terms used in the context of the present invention will first be explained.

The expression "aqueous coating composition" is known to the skilled person. It refers fundamentally to a coating composition which is not based exclusively on organic solvents. Indeed, any such coating composition based on organic solvents contains exclusively organic solvents and no water for dissolving and/or dispersing the components, or is a coating composition for which no water is added explicitly during its production, water entering the composition instead only in the form of contaminant, atmospheric moisture and/or solvent for any specific additives employed. Such a composition, in contrast to an aqueous coating composition, would be referred to as being solvent-based or "based on organic solvents". "Aqueous" in the context of the present invention should be understood preferably to mean that the coating composition comprises a water fraction of at least 20 wt %, preferably at least 25 wt %, very preferably at least 50 wt %, based in each case on the total amount of the solvents present (that is, water and organic solvents). The water fraction in turn is preferably 60 to 100 wt %, more particularly 65 to 90 wt %, very preferably 70 to 80 wt %, based in each case on the total amount of the solvents present.

The term "binder" in the sense of the present invention and in agreement with DIN EN ISO 4618 (German version, date: March 2007), refers preferably to those nonvolatile fractions of the composition of the invention that are responsible for forming the film, with the exception of any pigments and fillers therein, and more particularly refers to the polymeric resins which are responsible for film formation. The nonvolatile fraction may be determined by the method described in the Examples section.

To achieve a high flop index, the aqueous coating composition must comprise at least one anionically stabilized binder BM. Anionically stabilized binders BM are understood in accordance with the invention to be binders which comprise groups that can be converted by neutralizing agents into anionic groups (potentially anionic groups). The anionic groups which can be converted by neutralizing agents into anionic groups are, for example, carboxylic, sulfonic and/or phosphonic acid groups, more particularly carboxylic acid groups.

The term "polycarboxylic acid" refers in accordance with the invention to aliphatic or aromatic carboxylic acids which have at least two carboxylic acid groups per molecule. These carboxylic acid groups may be converted wholly or partly by neutralizing agents into anionic groups.

Application of a coating composition or composition to a substrate, and production of a coating film on a substrate, are understood as follows: The coating composition in question is applied such that the coating film produced from it is disposed on the substrate but need not necessarily be in direct contact with the substrate. Between the coating film and the substrate there may be other coats, for example. In step (1) of the method of the invention, for example, a cured first coat (S1) may be produced on the metallic substrate (S); however, between the substrate and the first coat (S1), there may also be a conversion coating as described later on below, such as a zinc phosphate coating, for example.

In contrast to this, the application of a coating composition directly to a substrate, or the production of a coating film directly on a substrate, is understood as follows: The coating composition in question is applied such that the coating film produced from it is disposed on the substrate and is in direct contact with the substrate. In particular, therefore, there is no other coat disposed between coating film and substrate.

Flashing, interim drying, and curing are understood in the context of the present invention to have the same semantic content as that familiar to the skilled person in connection with methods for producing multicoat paint systems.

The term "flashing" is understood accordingly in principle as a designation for the passive or active evaporation of organic solvents and/or water from a coating material applied as part of the production of a paint system, usually at ambient temperature (that is, room temperature), 15 to 35° C. for example, for a duration of 0.5 to 30 minutes, for example. Flashing is accompanied therefore by evaporation of organic solvents and/or water present in the applied coating material. After the flashing phase a comparatively smooth coating film arises, which comprises less water and/or solvent in comparison with the applied coating material. After flashing, however, the coating film is not yet in the service-ready state. While it is no longer flowable, for example, it is still soft and/or tacky, and possibly is only partly dried. In particular, the coating film is not yet cured as described later on below.

Interim drying is thus understood likewise to refer to the passive or active evaporation of organic solvents and/or water from a coating material applied as part of the production of a paint system, usually at a temperature increased relative to the ambient temperature and amounting, for example, to 40 to 90° C., for a duration of 1 to 60 minutes, for example. In the course of interim drying as well, therefore, the applied coating material will lose a fraction of organic solvents and/or water. Based on a particular coating material, the general rule is that interim drying, by comparison with flashing, proceeds for example at higher temperatures and/or for a longer time period, meaning that, by comparison with flashing, there is also a higher fraction of organic solvents and/or water that escapes from the applied coating film. Even interim drying, however, does not result in a coating film in the service-ready state, in other words not a cured coating film as described later on below. A conclusive delimitation of the two concepts from one another, however, is neither necessary nor intended. For the sake of pure comprehension, these terms are used in order to make it clear that variable and sequential conditioning of a coating film can take place, prior to the curing described below.

The curing of a coating film is understood accordingly to be the conversion of such a film into the service-ready state, in other words into a state in which the substrate furnished with the coating film in question can be transported, stored, and used in its intended manner. A cured coating film, then, is in particular no longer soft or tacky, but instead is conditioned as a solid coating film which, even on further exposure to curing conditions as described later on below, no longer exhibits any substantial change in its properties such as hardness or adhesion to the substrate.

As is known, coating materials may in principle be cured physically and/or chemically, depending on components present such as binders and crosslinking agents. In the case of chemical curing, consideration is given to thermochemical curing and actinic-chemical curing. Where, for example, a coating material is thermochemically curable, it may be self-crosslinking and/or externally crosslinking. The indication that a coating material is self-crosslinking and/or externally crosslinking means, in the context of the present invention, that this coating material comprises polymers as binders and optionally crosslinking agents that are able to crosslink with one another correspondingly. The parent mechanisms and also binders and crosslinking agents (film-forming components) that can be used are described later on below.

In the context of the present invention, "physically curable" or the term "physical curing" means the formation of a cured coating film by loss of solvent from polymer solutions or polymer dispersions, with the curing being achieved inter alia by interlooping of polymer chains. Coating materials of these kinds are generally formulated as one-component coating materials.

In the context of the present invention, "thermochemically curable" or the term "thermochemical curing" means the crosslinking of a coating film (formation of a cured coating film) initiated by chemical reaction of reactive functional groups, where the energetic activation of this chemical reaction is possible through thermal energy. Different functional groups which are complementary to one another can react with one another here (complementary functional groups), and/or the formation of the cured coat is based on the reaction of autoreactive groups, in other words functional groups which react among one another with groups of their own kind. Examples of suitable complementary reactive functional groups and autoreactive functional groups are known from German patent application DE 199 30 665 A1, page 7, line 28, to page 9, line 24, for example.

In thermochemically curable one-component systems, the components for crosslinking, as for example organic polymers as binders and crosslinking agents, are present alongside one another, in other words in one component. A requirement for this is that the components to be crosslinked effectively react with one another—that is, enter into curing reactions—only at relatively high temperatures of more than 100° C., for example. As an exemplary combination, mention may be made of hydroxy-functional polyesters and/or polyurethanes with melamine resins and/or blocked polyisocyanates as crosslinking agents.

In thermochemically curable two-component systems, the components that are to be crosslinked, as for example the organic polymers as binders and the crosslinking agents, are present separately from one another in at least two components, which are not combined until shortly before application. This form is selected when the components for crosslinking undergo effective reaction with one another even at ambient temperatures or slightly elevated temperatures of 40 to 90° C., for example. As an exemplary combination, mention may be made of hydroxy-functional polyesters and/or polyurethanes and/or poly(meth)acrylates with free polyisocyanates as crosslinking agent.

In the context of the present invention, "actinic-chemically curable", or the term "actinic-chemical curing", refers to the fact that the curing is possible with application of actinic radiation, this being electromagnetic radiation such as near infrared (NIR) and UV radiation, more particularly UV radiation, and also particulate radiation such as electron beams. The curing by UV radiation is initiated customarily by radical or cationic photoinitiators. Typical actinically curable functional groups are carbon-carbon double bonds, with radical photoinitiators generally being employed in that case. Actinic curing, then, is likewise based on chemical crosslinking.

Of course, in the curing of a coating material identified as chemically curable, there will always be physical curing as well, in other words the interlooping of polymer chains. The physical curing may even be predominant. Provided it includes at least a proportion of film-forming components that are chemically curable, nevertheless, a coating material of this kind is identified as chemically curable.

In the case of a purely physically curing coating material, curing takes place preferably between 15 and 90° C. over a period of 2 to 48 hours. In this case, then, the curing differs from the flashing and/or interim drying, where appropriate, solely in the duration of the conditioning of the coating film. Differentiation between flashing and interim drying, moreover, is not sensible. It would be possible, for example, for a coating film produced by application of a physically curable coating material to be subjected to flashing or interim drying first of all at 15 to 35° C. for a duration of 0.5 to 30 minutes, for example, and then to be cured at 50° C. for a duration of 5 hours.

In principle, and in the context of the present invention, the curing of thermochemically curable one-component systems can be carried out preferably at temperatures of 100 to 250° C., preferably 100 to 180° C., for a duration of 5 to 60 minutes, preferably 10 to 45 minutes, since these conditions are generally necessary in order for chemical crosslinking reactions to convert the coating film into a cured coating film. Accordingly it is the case that a flashing and/or interim drying phase taking place prior to curing takes place at lower temperatures and/or for shorter times. In such a case, for example, flashing may take place at 15 to 35° C. for a duration of 0.5 to 30 minutes, for example, and/or interim drying may take place at a temperature of 40 to 90° C., for example, for a duration of 1 to 60 minutes, for example.

In principle, and in the context of the present invention, the curing of thermochemically curable two-component systems is carried out at temperatures of 15 to 90° C., for example, in particular 40 to 90° C., for a duration of 5 to 80 minutes, preferably 10 to 50 minutes. Accordingly it is the case that a flashing and/or interim drying phase occurring prior to curing takes place at lower temperatures and/or for shorter times. In such a case, for example, it is no longer sensible to make any distinction between the concepts of flashing and interim drying. A flashing or interim drying phase which precedes curing may take place, for example, at 15 to 35° C. for a duration of 0.5 to 30 minutes, for example, but at any rate at lower temperatures and/or for shorter times than the curing that then follows.

This of course is not to rule out a thermochemically curable two-component system being cured at higher temperatures. For example, in step (4) of the method of the invention as described with more precision later on below, a basecoat film or two or more basecoat films are cured jointly with a clearcoat film. Where both thermochemically curable one-component systems and two-component systems are present within the films, a one-component basecoat material and a two-component clearcoat material, for example, the joint curing is of course guided by the curing conditions that are necessary for the one-component system.

All temperatures elucidated in the context of the present invention should be understood as the temperature of the room in which the coated substrate is located. It does not mean, therefore, that the substrate itself is required to have the temperature in question.

According to one embodiment of the method of the invention for producing the multicoat paint system, the at least one polycarboxylic acid PC and the at least one solvent L can be mixed with the aqueous basecoat material directly before it is applied, this material comprising at least one anionically stabilized binder BM and at least one effect pigment EP. This means that the addition of the at least one polycarboxylic acid PC and of the at least one solvent L is made during the production of the multicoat paint system, more particularly shortly before the use of the aqueous basecoat composition within the method of the invention. Conversely, the term "directly before application" in the context of the present invention embraces neither the addition of the at least one polycarboxylic acid PC and of the at least one solvent L during the production of the basecoat composition, nor the addition of the at least one polycarboxylic acid PC and of the at least one solvent L directly after production of the basecoat composition.

The term "color matching" refers here to the matching of the shade of a cured coating of an aqueous coating composition on a metallic substrate to a target color (also called shade original), the matching of the shade being accomplished by addition of the at least one polycarboxylic acid PC. The matching of the shade may in this context be accomplished directly after production of the aqueous coating composition or else directly before application of the aqueous coating composition, during the production of a multicoat paint system. Serving as the target color (shade original) is a cured coating of an aqueous coating composition, which exhibits the desired hue. The comparison of the shade obtained from the cured aqueous coating composition and the target color (shade original) may be made visually, for example, by means of methods of coloristic measurement that are known to the skilled person.

The measurement methods to be employed in the context of the present invention for determining certain characteristic variables are evident from the Examples section. Unless explicitly indicated otherwise, these measurement methods are to be used for determining the respective characteristic variable.

Where reference is made in the context of the present invention to an official standard, without indication of the official validity period, the reference is of course to the version of the standard valid on the filing date or, if there is no valid version at that date, the most recent valid version.

Aqueous Coating Composition of the Invention:

Anionically Stabilized Binder BM (a):

As a first essential constituent, the coating composition of the invention comprises at least one anionically stabilized binder BM. The high flop index is achieved only on combination of an anionically stabilized binder BM with the polycarboxylic acid PC. Where, conversely, nonionically stabilized binders are used, the addition of the polycarboxylic acid PC does not result in a high flop index. Nonionically stabilized binders in this context are binders which in particular have significant fractions of certain water-soluble, nonionic groups, preferably poly(oxyalkylene) groups, polylactone groups such as polybutyrolactone groups, polyalchohol groups, such as polyvinyl alcohol groups, polyamide groups, such as polyacrylamide groups, and also polyvinylpyrrolidone groups, more particularly poly(oxyethylene) and/or poly(oxypropylene) groups.

Particular preference is given to using anionically stabilized binders which at a pH of 8.0 have a certain electrophoretic mobility. The electrophoretic mobility here may be determined as described in the Examples section. In one preferred embodiment of the present invention, therefore, the at least one anionically stabilized binder BM at a pH of 8.0 has an electrophoretic mobility of −2.5 to −15 (μm/s)/(V/cm), preferably of −2.5 to −10 (μm/s)/(V/cm), more preferably of −4 to −8 (μm/s)/(V/cm), more particularly of −5 to −8 (μm/s)/(V/cm). The use of at least one anionically stabilized binder BM having the aforesaid electrophoretic mobility leads, in combination with the at least one polycarboxylic acid PC, to a high flop index, though without adversely affecting the performance properties, the leveling, and the optical and coloristic properties of the coating achieved.

It is advantageous, furthermore, if the anionically stabilized binder BM is present in a defined total amount in the aqueous coating composition of the invention. In one preferred embodiment of the present invention, therefore, the at least one anionically stabilized binder BM is present in a total amount of 20 to 80 wt %, preferably of 30 to 70 wt %, more particularly of 40 to 70 wt %, based in each case on the overall solids content of the coating composition. If more than one anionically stabilized binder BM is used, then the aforesaid quantity ranges are based on the total amount of anionically stabilized binders BM in the composition. The use of the at least one anionically stabilized binder BM in the aforesaid quantity ranges leads, in combination with the at least one polycarboxylic acid PC, to a high flop index and also to good optical and coloristic properties, but without adversely affecting the storage stability of the compositions of the invention. Moreover, the use of the aforementioned quantities of anionically stabilized binder BM leads to effective fixing of the orientation of the effect particles during flashing, and so a subsequent application of further coating compositions has no adverse effect on the orientation of the effect particles and hence on the flop index.

In the context of the present invention it has proven advantageous if the anionically stabilized binder BM comprises anionically stabilized polyurethane-polyurea particles (PPP) in dispersion in water. In one preferred embodiment of the first subject of the invention, therefore, the anionically stabilized binder BM comprises anionically stabilized polyurethane-polyurea particles (PPP) in dispersion in water and having an average particle size of 40 to 2000 nm and a gel fraction of at least 50%, the anionically stabilized polyurethane-polyurea particles (PPP) comprising, in each case in reacted form, (Z.1.1) at least one isocyanate group-containing polyurethane prepolymer containing groups which are anionic and/or can be converted into anionic groups, and (Z.1.2.) at least one polyamine containing two primary amino groups and one or two secondary amino groups.

The anionically stabilized polyurethane-polyurea particles (PPP) are in dispersion in water, or present in the form of an aqueous dispersion. The fraction of water in the dispersion is preferably 45 to 75 wt %, preferably 50 to 70 wt %, more preferably 55 to 65 wt %, based in each case on the total amount of the dispersion. It is preferred for the dispersion to consist to an extent of at least 90 wt %, preferably at least 92.5 wt %, very preferably at least 95 wt %, and more preferably at least 97.5 wt %, of the polyurethane-polyurea particles (PPP) and water (the associated value is obtained by summating the amount of the particles (that is, of the polymer, determined via the solids content) and the amount of water).

The anionically stabilized polyurethane-polyurea particles (PPP) are polymer particles which are polyurethane-polyurea-based. The anionically stabilized polyurethane-polyurea particles (PPP) possess a gel fraction of at least 50% (for measurement method, see Examples section) and an average particle size (also called mean particle size) of 40 to 2000 nanometers (nm) (for measurement method, see Examples section). The polyurethane-polyurea particles (PPP) therefore constitute a microgel. The reason is that on the one hand the polymer particles are in the form of comparatively small particles, or microparticles, and on the other hand they are at least partly intramolecularly cross-linked. The latter means that the polymer structures present within a particle equate to a typical macroscopic network with a three-dimensional network structure. Viewed macroscopically, however, a microgel of this kind continues to comprise discrete polymer particles.

Because the microgels represent structures which lie between branched and macroscopically crosslinked systems, they combine, consequently, the characteristics of macromolecules with network structure that are soluble in suitable organic solvents, and insoluble macroscopic networks, and so the fraction of the crosslinked polymers can be determined, for example, only following isolation of the solid polymer, after removal of water and any organic solvents, and subsequent extraction. The phenomenon utilized here is that whereby the microgel particles, originally soluble in suitable organic solvents, retain their inner network structure after isolation and behave, in the solid, like a macroscopic network. Crosslinking may be verified via the experimentally accessible gel fraction. Lastly, the gel fraction is that fraction of the polymer in the microgel that cannot be molecularly dispersely dissolved, as an isolated solid, in a solvent. It is necessary here to rule out a further increase in the gel fraction from crosslinking reactions subsequent to the isolation of the polymeric solid. This insoluble fraction corresponds in turn to the fraction of the polymer that is present in the form of intramolecularly crosslinked particles or particle fractions.

The polyurethane-polyurea particles (PPP) preferably possess a gel fraction of 50%, preferably of at least 60%, more preferably of at least 70%, more particularly of at least 80%. The gel fraction may therefore be up to 100% or nearly 100%, as for example 99% or 98%. In such a case, then, the entire, or almost the entire, polyurethane-polyurea polymer is in the form of crosslinked particles.

The polyurethane-polyurea particles (PPP) possess an average particle size of 40 to 2000 nm preferably of 40 to 1500 nm, more preferably of 100 to 1000 nm, more preferably still of 110 to 500 nm, more particularly of 120 to 300 nm. An especially preferred range is from 130 to 250 nm.

The polyurethane-polyurea particles (PPP) comprise, in each case in reacted form, (Z.1.1) at least one polyurethane prepolymer containing isocyanate groups and containing groups which are anionic and/or can be converted into anionic groups, and also (Z.1.2) at least one polyamine containing two primary amino groups and one or two secondary amino groups. The expression "the polyurethane-polyurea particles (PPP) comprise, in each case in reacted form, a polyurethane prepolymer (Z.1.1) and a polyamine (Z.1.2)" here means that an aforesaid NCO-containing polyurethane prepolymer (Z.1.1) and also a polyamine (Z.1.2) were used in preparing the polyurethane-polyurea particles (PPP) and that these two components react with one another to form urea compounds.

The polyurethane-polyurea particles (PPP) preferably consist of the two components (Z.1.1) and (Z.1.2), meaning that they are prepared from these two components. The polyurethane-polyurea particles (PPP) in dispersion in water may be obtained, for example, by a specific three-stage process.

In a first step (I) of this process, a composition (Z) is prepared. The composition (Z) comprises at least one, preferably precisely one, specific intermediate (Z.L) containing isocyanate groups and blocked primary amino groups. The preparation of the intermediate (Z.1) comprises the reaction of at least one polyurethane prepolymer (Z.1.1) containing isocyanate groups and groups which are anionic and/or can be converted into anionic groups, with at least one compound (Z.1.2a) which is derived from a polyamine (Z.1.2) and contains at least two blocked primary amino groups and at least one free secondary amino group.

For the purposes of the present invention, the component (Z.1.1) is referred to, for ease of comprehension, as a prepolymer.

The prepolymers (Z.1.1) comprise groups which are anionic and/or can be converted into anionic groups (that is, groups which can be converted into anionic groups through the use of neutralizing agents which are known and also specified later on below, such as bases). As the skilled person is aware, these groups are, for example, carboxylic, sulfonic and/or phosphonic acid groups, more particularly carboxylic acid groups (functional groups which can be converted into anionic groups by neutralizing agents), and also anionic groups derived from the aforementioned functional groups, such as, more particularly, carboxylate, sulfonate and/or phosphonate groups, preferably carboxylate groups. Introducing such groups is known to increase the dispersibility in water. Depending on the conditions selected, the stated groups may be present proportionally or almost completely in the one form (carboxylic acid, for example) or the other form (carboxylate), through the use, for example, of neutralizing agents that are described later on below.

To introduce the stated groups it is possible, during the preparation of the prepolymers (Z.1.1), to use starting compounds which as well as groups for reaction in the preparation of urethane bonds, preferably hydroxyl groups, further comprise the abovementioned groups, carboxylic acid groups for example. In this way the groups in question are introduced into the prepolymer.

Corresponding compounds contemplated for introducing the preferred carboxylic acid groups include—insofar as they contain carboxyl groups—polyether polyols and/or polyester polyols. Used with preference, however, are in any case low molecular mass compounds which have at least one carboxylic acid group and at least one functional group that is reactive toward isocyanate groups—hydroxyl groups, preferably. The expression "low molecular mass compound" means in the context of the present invention that the compounds in question have a molecular weight of less than 300 g/mol. The range from 100 to 200 g/mol is preferred. Examples of compounds preferred in this sense are monocarboxylic acids containing two hydroxyl groups, such as dihydroxypropionic acid, dihydroxysuccinic acid, and dihydroxybenzoic acid, for example. More particularly they are $\alpha,\alpha$-dimethylolalkanoic acids such as 2,2-dimethylolacetic acid, 2,2-dimethylolpropionic acid, 2,2-dimethylolbutyric acid, and 2,2-dimethylolpentanoic acid, especially 2,2-dimethylolpropionic acid.

The prepolymers (Z.1.1) therefore preferably contain carboxylic acid groups. Based on the solids content, they possess preferably an acid number of 10 to 30 mg KOH/g, more particularly 15 to 23 mg KOH/g (for measurement method, see Examples section).

The prepolymers (Z.1.1) are prepared preferably by reaction of diisocyanates with polyols. Examples of suitable polyols are saturated or olefinically unsaturated polyester polyols and/or polyether polyols as described for example in WO 2018/011311 A1 and WO 2016/091546 A1. Polyols used with preference for preparing the prepolymers (Z.1.1) are polyester diols which have been prepared using dimer fatty acids. Especially preferred are polyester diols prepared using dicarboxylic acids of which at least 50 wt %, preferably 55 to 75 wt %, of those used are dimer fatty acids.

Dimer fatty acids are oligomers of forms of unsaturated monomeric fatty acids. Fatty acids are saturated or unsaturated, especially unbranched, monocarboxylic acids having 8 to 64 carbon atoms.

Additionally for preparing the polymers (Z.1.1) it is also possible to use polyamines such as diamines and/or amino alcohols. Examples of diamines include hydrazine, alkyl- or cycloalkyldiamines such as propylenediamine and 1-amino-3-aminomethyl-3,5,5-trimethylcyclohexane, and examples of amino alcohols include ethanolamine or diethanolamine.

With regard to the polyisocyanates suitable for preparing the polyurethane prepolymers (Z.1.1) containing isocyanate groups, reference is made to the laid-open specifications WO 2018/011311 A1 and WO 2016/091546 A1. Preferred is the use of aliphatic diisocyanates, such as hexamethylene diisocyanate, isophorone diisocyanate (IPDI), dicyclohexylmethane 4,4'-diisocyanate, 2,4- or 2,6-diisocyanato-1-methylcyclohexane and/or m-tetramethylxylylene diisocyanate (m-TMXDI).

The number-average molecular weight of the prepolymers may vary widely and be situated for example in the range from 2000 to 20 000 g/mol, preferably from 3500 to 6000 g/mol (for measurement method, see Examples section).

The prepolymer (Z.1.1) contains isocyanate groups. Based on the solids content, it preferably possesses an isocyanate content of 0.5 to 6.0 wt %, preferably 1.0 to 5.0 wt %, especially preferably 1.5 to 4.0 wt % (for measurement method, see Examples section).

The hydroxyl number of the prepolymer, based on the solids content, is preferably less than 15 mg KOH/g, more particularly less than 10 mg KOH/g, more preferably still less than 5 mg KOH/g (for measurement method, see Examples section).

The prepolymers (Z.1.1) may be prepared as described in WO 2018/011311 A1 and WO 2016/091546 A1.

As already indicated above, the groups which are present in the prepolymer (Z.1.1) and can be converted into anionic groups may also be present proportionally as correspondingly anionic groups, through the use of a neutralizing agent, for example. In this way it is possible to adjust the water dispersibility of the prepolymers (Z.1.1) and hence also of the intermediate (Z.1). Neutralizing agents contemplated include in particular the known basic neutralizing agents such as, for example, carbonates, hydrogen carbonates or hydroxides of alkali metals and alkaline earth metals, such as, for example LiOH, NaOH, KOH or Ca(OH)$_2$. Also suitable for the neutralization and preferred in the context of the present invention for use are organic, nitrogen-containing bases such as amines like ammonia, trimethylamine, triethylamine, tributylamines, dimethylaniline, triphenylamine, dimethylethanolamine, methyldiethanolamine or triethanolamine, and also mixtures thereof.

If neutralization of the groups—particularly the carboxylic acid groups—which can be converted into anionic groups is desired, the neutralizing agent may be added, for example, in an amount such that a fraction of 35% to 65% of the groups is neutralized (degree of neutralization). Preferred is a range from 40% to 60% (for calculation method, see Examples section).

The compound (Z.1.2a) comprises two blocked primary amino groups and one or two free secondary amino groups.

Blocked amino groups, as is known, are those in which the hydrogen radicals on the nitrogen that are present inherently in free amino groups have been substituted by reversible reaction with a blocking agent. In view of the blocking, the amino groups cannot be reacted like free amino groups, via condensation or addition reactions, and in this respect are therefore nonreactive and so differ from free amino groups. The primary amino groups of the compound (Z.1.2a) may be blocked with the blocking agents that are known per se, as for example with ketones and/or aldehydes. In the case of such blocking, ketimines and/or aldimines are then produced, with release of water. Groups of this kind can be unblocked with addition of water.

If an amino group is specified neither as being blocked nor as being free, the reference is to a free amino group.

Preferred blocking agents for blocking the primary amino groups of the compound (Z.1.2a) are ketones. Particularly preferred among the ketones are those which are an organic solvent (Z.2) as described later on below. The reason is that this solvent (Z.2) must in any case be present in the composition (Z) to be prepared in stage (I) of the method. Through the use of ketones (Z.2) for blocking, the correspondingly preferred production process for blocked amines can therefore be employed, without the possibly unwanted blocking agent having to be separated off, at cost and inconvenience. Instead, the solution of the blocked amine can be used directly for preparing the intermediate (Z.1). Preferred blocking agents are acetone, methyl ethyl ketone, methyl isobutyl ketone, diisopropyl ketone, cyclopentanone or cyclohexanone; particularly preferred are the ketones (Z.2) methyl ethyl ketone and methyl isobutyl ketone.

The preferred blocking with ketones and/or aldehydes, especially ketones, and the associated preparation of ketimines and/or aldimines, have the advantage, moreover, that primary amino groups are blocked selectively. Secondary amino groups present are evidently unable to be blocked, and therefore remain free. Consequently the compound (Z.1.2a) which as well as the two blocked primary amino groups also comprises one or two free secondary amino groups can be prepared readily by way of the stated preferred blocking reactions from a corresponding polyamine (Z.1.2) which contains free secondary and primary amino groups.

The compounds (Z.1.2a) preferably possess two blocked primary amino groups and one or two free secondary amino groups, and the primary amino groups they possess are exclusively blocked primary amino groups, and the secondary amino groups they possess are exclusively free secondary amino groups.

The compounds (Z.1.2a) preferably possess a total of three or four amino groups, these being selected from the group of blocked primary amino groups and of free secondary amino groups.

Especially preferred compounds (Z.1.2a) are those which consist of two blocked primary amino groups, one or two free secondary amino groups, and also aliphatically saturated hydrocarbon groups.

Analogous preferred embodiments are valid for the polyamines (Z.1.2), with these polyamines then containing free primary amino groups rather than blocked primary amino groups. Examples of preferred polyamines (Z.1.2), from which it is also possible to prepare compounds (Z.1.2a) by blocking of the primary amino groups, are diethylenetriamine, 3-(2-aminoethyl)aminopropylamine, dipropylenetriamine, and also N1-(2-(4-(2-aminoethyl)piperazin-1-yl)ethyl)-ethane-1,2-diamine (one secondary amino group, two primary amino groups to be blocked) and triethylenetetramine, and also N,N'-bis(3-aminopropyl)ethylenediamine (two secondary amino groups, two primary amino groups to be blocked).

If a certain quantity of a polyamine is blocked, the blocking may result for example in a fraction of 95 mol % or more of the primary amino groups becoming blocked (this fraction can be determined by IR spectroscopy; see Examples section). Where, for example, a polyamine in the unblocked state possesses two free primary amino groups, and where the primary amino groups of a certain amount of this amine are then blocked, it is said in the context of the present invention that this amine has two blocked primary amino groups if a fraction of more than 95 mol % of the primary amino groups present in the amount employed are blocked.

The preparation of the intermediate (Z.1) comprises the reaction of the prepolymer (Z.1.1) with the compound (Z.1.2a) by addition reaction of isocyanate groups from (Z.1.1) with free secondary amino groups from (Z.1.2a). This reaction, which is known per se, then leads to the attachment of the compound (Z.1.2a) onto the prepolymer (Z.1.1) to form urea bonds, ultimately giving the intermediate (Z.1).

The intermediate (Z.1) may be prepared as described in WO 2018/011311 A1 and WO 2016/091546 A1.

The fraction of the intermediate (Z.1) is from 15 to 65 wt %, preferably from 25 to 60 wt %, more preferably from 30 to 55 wt %, especially preferably from 35 to 52.5 wt %, and, in one very particular embodiment, from 40 to 50 wt %, based in each case on the total amount of the composition (Z).

The composition (Z) further comprises at least one specific organic solvent (Z.2). The solvents (Z.2) at a temperature of 20° C. possess a solubility in water of at most 38 wt % (for measurement method, see Examples section). The solubility in water at a temperature of 20° C. is preferably less than 30 wt %. A preferred range is from 1 to 30 wt %. Accordingly, the solvent (Z.2) possesses a fairly moderate solubility in water, and more particularly is not completely miscible with water, or possesses no unlimited solubility in water.

Examples of solvents (Z.2) are methyl ethyl ketone, methyl isobutyl ketone, diisobutyl ketone, diethyl ether, dibutyl ether, dipropylene glycol dimethyl ether, ethylene glycol diethyl ether, toluene, methyl acetate, ethyl acetate, butyl acetate, propylene carbonate, cyclohexanone, or mixtures of these solvents. Preferred is methyl ethyl ketone, which at 20° C. has a solubility in water of 24 wt %. No solvents (Z.2) are therefore solvents such as acetone, N-methyl-2-pyrrolidone, N-ethyl-2-pyrrolidone, tetrahydrofuran, dioxane, N-formylmorpholine, dimethylformamide or dimethyl sulfoxide.

The effect of selecting the specific solvents (Z.2) with only limited water solubility is in particular that on dispersing of the composition (Z) in aqueous phase, which takes place in step (II) of the process, a homogeneous solution cannot be formed directly; instead, the crosslinking reactions that take place within step (II) (addition reactions of free primary amino groups and isocyanate groups to form urea bonds) proceed in a limited volume, thereby enabling the formation of the microparticles as defined above.

The fraction of the at least one organic solvent (Z.2) is from 35 to 85 wt %, preferably from 40 to 75 wt %, more preferably from 45 to 70 wt %, especially preferably from 47.5 to 65 wt %, and, in one very particular embodiment, from 50 to 60 wt %, based in each case on the total amount of the composition (Z).

Within the present invention it has emerged that as a result of the targeted combination of an as-above-specified fraction of the intermediate (Z.1) in the composition (Z) and of the selection of the specific solvent (Z.2) it is possible in accordance with the steps (II) and (III) described below to provide polyurethane-polyurea dispersions which comprise polyurethane-polyurea particles (PPP) having the requisite particle size and gel fraction.

The components (Z.1) and (Z.2) described account in total for preferably at least 90 wt % of the composition (Z). The two components account for preferably at least 95 wt %, more particularly at least 97.5 wt %, of the composition (Z). With very particular preference the composition (Z) consists of these two components. In this context it may be noted that, where neutralizing agents as described above are employed, these neutralizing agents are included with the intermediate when calculating the amount of an intermediate (Z.1). The solids content of the composition (Z) preferably therefore corresponds to the fraction of the intermediate (Z.1) in the composition (Z). Accordingly, the composition (Z) preferably possesses a solids content of 15 to 65 wt %, preferably of 25 to 60 wt %, more preferably of 30 to 55 wt %, especially preferably of 35 to 52.5 wt %, and, in one very particular embodiment, from 40 to 50 wt %.

A particularly preferred composition (Z) therefore comprises in total at least 90 wt % of the components (Z.1) and (Z.2) and apart from the intermediate (Z.1) comprises exclusively organic solvents.

In step (II) of the process described here, then, the composition (Z) is dispersed in water, accompanied by deblocking of the blocked primary amino groups of the intermediate (Z.1) and by reaction of the resultant free primary amino groups with the isocyanate groups of the intermediate (Z.1) and also with the isocyanate groups of the deblocked intermediate resulting from the intermediate (Z.1), this reaction being an addition reaction.

Step (II) of the process of the invention may take place as described in WO 2018/011311 A1 and WO 2016/091546 A1.

The fraction of the polyurethane-polyurea particles (PPP) in the dispersion is preferably 25 to 55 wt %, preferably 30 to 50 wt %, more preferably 35 to 45 wt %, based in each case on the total amount of the dispersion (determined analogously to the determination via the solids content as described above for the intermediate (Z.1)).

The polyurethane-polyurea particles (PPP) preferably possess an acid number of 10 to 35 mg KOH/g, more particularly of 15 to 23 mg KOH/g (for measurement method, see Examples section). Moreover, the polyurethane-polyurea particles possess very few hydroxyl groups or none. The OH number of the particles is therefore less than 15 mg KOH/g, more particularly less than 10 mg KOH/g, more preferably less than 5 mg KOH/g (for measurement method, see Examples section).

The anionically stabilized polyurethane-polyurea particles (PPP) in dispersion in water preferably have, at a pH of 8.0, an electrophoretic mobility of −6 to −8 (µm/s)/(V/cm).

Furthermore, the coating composition may comprise the anionically stabilized polyurethane-polyurea particles (PPP) in a total amount of 10 to 50 wt %, preferably of 20 to 45 wt %, more particularly of 23 to 40 wt %, based in each case on the overall solids content of the coating composition. The use of the anionically stabilized polyurethane-polyurea particles (PPP) in the aforesaid total amounts, in combination with the at least one polycarboxylic acid PC, results in a high flop index. Moreover, the use of this binder leads to effective fixing of the oriented effect particles EP during the flashing of the coating composition of the invention, and so the high flop index is not negatively influenced even when further layers of coating composition are applied.

It may be advantageous in accordance with the invention, besides or instead of the above-described anionically stabilized polyurethane-polyurea particles (PPP), to use an anionically stabilized polymer (asP) as anionically stabilized binder BM. With particular preference the composition of the invention comprises at least two mutually different anionically stabilized binders BM, with the first anionically stabilized binder BM being the aforesaid anionically stabilized polyurethane-polyurea particles (PPP), and the second anionically stabilized binder BM being the anionically stabilized polymer (asP) described below.

In the context of the present invention it has therefore proven advantageous if the at least one anionically stabilized binder BM is an anionically stabilized seed-core-shell polymer (asP) in dispersion in water. It is therefore particularly preferred in accordance with the invention if the at least one anionically stabilized binder BM comprises at least one anionically stabilized polymer (asP) in dispersion in water and having an average particle size of 100 to 500 nm, the preparation of the anionically stabilized polymer (asP) comprising the consecutive radical emulsion polymerization of three mixtures (A), (B), and (C) of olefinically unsaturated monomers, where the mixture (A) comprises at least 50 wt % of vinylaromatic monomers, and a polymer prepared from the mixture (A) possesses a glass transition temperature of 10 to 65° C., the mixture (B) comprises at least one polyunsaturated monomer, and a polymer prepared from the mixture (B) possesses a glass transition temperature of −35 to 15° C., and the mixture (C) comprises at least one anionic monomer, and a polymer prepared from the mixture (C) possesses a glass transition temperature of −50 to 15° C., and where
i. first the mixture (A) is polymerized,
ii. then the mixture (B) is polymerized in the presence of the polymer prepared under i., and
iii. thereafter the mixture (C) is polymerized in the presence of the polymer prepared under ii.

The anionically stabilized polymer (asP) is in dispersion in water. Consequently, the anionically stabilized polymer (asP) takes the form of an aqueous dispersion. The expression "in dispersion in water or aqueous dispersion" is known in this context to the skilled person. It refers fundamentally to a system whose dispersion medium does not exclusively or primarily comprise organic solvents (also called solvents) but instead comprises a significant fraction of water. The aqueous dispersion preferably comprises a water fraction of 55 to 75 wt %, especially preferably 60 to 70 wt %, based in each case on the total weight of the dispersion.

There is preferably precisely one above-described polymer (asP) in dispersion in water. The preparation of the anionically stabilized polymer (asP) comprises the consecutive radical emulsion polymerization of three mixtures (A), (B) and (C) of olefinically unsaturated monomers, using water-soluble initiators, as described in WO 2017/088988 A1, for example.

The individual polymerization stages in the preparation of the anionically stabilized polymer (asP) may be carried out, for example, as what are called "starved feed" polymerizations (also known as "starve feed" or "starve fed" polymerizations). A starved feed polymerization in the sense of the present invention is an emulsion polymerization in which the amount of free olefinically unsaturated monomers in the reaction solution (also called reaction mixture) is minimized throughout the reaction time. This means that the metered addition of the olefinically unsaturated monomers is such that over the entire reaction time a fraction of free monomers in the reaction solution does not exceed 6.0 wt %, preferably 5.0 wt %, more preferably 4.0 wt %, particularly advantageously 3.5 wt %, based in each case on the total amount of the monomers used in the respective polymerization stage.

The concentration of the monomers in the reaction solution here may be determined by gas chromatography, for example, as described in laid-open specification WO 2017/088988 A1. The fraction of the free monomers can be controlled by the interplay of initiator quantity, rate of initiator addition, rate of monomer addition, and through the selection of the monomers. Not only the slowing-down of metering but also the increase in the initial quantity, and also the premature commencement of addition of the initiator, serve the aim of keeping the concentration of free monomers below the limits stated above.

For the purposes of the present invention it is preferable for the polymerization stages ii. and iii. to be carried out under starved feed conditions. This has the advantage that the formation of new particle nuclei within these two polymerization stages is effectively minimized. Instead, the particles existing after stage i. (and therefore also called seed below) can be grown further in stage ii. by the polymerization of the monomer mixture B (therefore also called core below). It is likewise possible for the particles existing after stage ii. (also below called polymer comprising seed and core) to be grown further in stage iii. through the polymerization of the monomer mixture C (therefore also called shell below), resulting ultimately in a polymer comprising particles containing seed, core, and shell. Stage i. as well can of course be carried out under starved feed conditions.

The mixtures (A), (B), and (C) are mixtures of olefinically unsaturated monomers, and the mixtures (A), (B), and (C) are different from one another. They therefore each contain different monomers and/or different proportions of at least one defined monomer. The fractions of the monomer mixtures are preferably matched to one another as follows. The fraction of the mixture (A) is from 0.1 to 10 wt %, the fraction of the mixture (B) is from 60 to 80 wt % and the fraction of the mixture (C) is from 10 to 30 wt %, based in each case on the sum of the individual amounts of mixtures (A), (B), and (C).

Mixture (A) comprises at least 50 wt %, in particular at least 55 wt %, of vinylaromatic compounds. One such preferred monomer is styrene. Besides the vinylaromatic compounds, the mixture (A) contains no monomers that have functional groups containing heteroatoms. With particular preference, the monomer mixture (A) comprises at least one monounsaturated ester of (meth)acrylic acid with an alkyl radical and at least one monoolefinically unsaturated monomer containing vinyl groups, with a radical arranged on the vinyl group that is aromatic or that is a mixed saturated aliphatic-aromatic radical, in which case the aliphatic fractions of the radical are alkyl groups.

The monomers present in the mixture (A) are selected such that a polymer prepared from them possesses a glass transition temperature of 10 to 65° C., preferably of 30 to 50° C. For a useful estimation of the glass transition temperature to be expected in the measurement, the Fox equation known to the skilled person can be employed.

The polymer prepared in stage i. by the emulsion polymerization of the monomer mixture (A) preferably has a particle size of 20 to 125 nm (for the measurement of the particle size see the Examples section).

Mixture (B) comprises at least one polyolefinically unsaturated monomer, preferably at least one diolefinically unsaturated monomer, in particular exclusively diolefinically unsaturated monomers. One such preferred monomer is 1,6-hexanediol diacrylate. Preferably the monomer mixture (B) likewise contains no monomers with functional groups containing heteroatoms. Particularly preferably, the monomer mixture (B), as well as at least one polyolefinically unsaturated monomer, includes at any rate the following further monomers. First of all, at least one monounsaturated ester of (meth)acrylic acid with an alkyl radical, and secondly at least one monoolefinically unsaturated monomer containing vinyl groups and having a radical arranged on the vinyl group that is aromatic or that is a mixed saturated aliphatic-aromatic radical, in which case the aliphatic fractions of the radical are alkyl groups.

The fraction of polyunsaturated monomers is preferably from 0.05 to 3 mol %, based on the total molar amount of monomers in the monomer mixture (B).

The monomer mixtures (A) and (B) preferably contain no hydroxy-functional monomers and no acid-functional monomers. The monomer mixtures (A) and (B) accordingly contain 0 wt %, based on the sum of the individual amounts of the mixtures (A), (B) and (C), of hydroxy-functional and acid-functional monomers.

The monomers present in the mixture (B) are selected such that a polymer prepared therefrom possesses a glass transition temperature of −35 to 15° C., preferably of −25 to +7° C.

The polymer which is obtained after stage ii. preferably possesses a particle size of 80 to 280 nm, preferably 120 to 250 nm.

The monomers present in the mixture (C) are selected such that a polymer prepared therefrom possesses a glass transition temperature of −50 to 15° C., preferably of −20 to +12° C.

The olefinically unsaturated monomers of this mixture (C) are preferably selected such that the resulting polymer, comprising seed, core, and shell, has an acid number of 10 to 25. Accordingly, the mixture (C) preferably comprises at least one α,β-unsaturated carboxylic acid, especially (meth)acrylic acid.

The olefinically unsaturated monomers of the mixture (C) are further preferably selected such that the resulting polymer, comprising seed, core, and shell, has an OH number of 0 to 30, preferably 10 to 25. All of the aforementioned acid numbers and OH numbers are values calculated on the basis of the monomer mixtures employed overall.

Particularly preferably, the monomer mixture (C) comprises at least one α,β-unsaturated carboxylic acid, at least one monounsaturated ester of (meth)acrylic acid having an alkyl radical substituted by a hydroxyl group, and at least one monounsaturated ester of (meth)acrylic acid having an alkyl radical.

With particular preference neither the monomer mixture (A) nor the monomer mixtures (B) or (C) comprise a polyurethane polymer which has at least one polymerizable double bond.

Following its preparation, the anionically stabilized polymer (asP) possesses an average particle size of 100 to 500 nm, preferably 125 to 400 nm, very preferably from 130 to 300 nm, and also a glass transition temperature $T_g$ of −20 to −5° C.

The aqueous dispersion of the anionically stabilized polymer (asP) preferably possesses a pH of 5.0 to 9.0, more preferably 7.0 to 8.5, very preferably 7.5 to 8.5.

The pH may be kept constant during the preparation itself, through the use of bases as identified further on below, for example, or else may be set deliberately after the anionically stabilized polymer (asP) has been prepared. The stages i. to iii. described are carried out preferably without addition of acids or bases known for the setting of the pH, and the pH is set only after the preparation of the polymer, by addition of organic, nitrogen-containing bases, sodium hydrogencarbonate, borates, and also mixtures of the aforesaid substances.

The solids content of the aqueous dispersion of the anionically stabilized polymer (asP) is preferably from 15% to 40% and more preferably 20% to 30%.

An anionically stabilized polymer (asP) used particularly in the context of the present invention is preparable by reacting
- a mixture (A) of 50 to 85 wt % of a vinylaromatic monomer and 15 to 50 wt % of a monounsaturated ester of (meth)acrylic acid with an alkyl radical,
- a mixture (B) of 1 to 4 wt % of a polyolefinically unsaturated monomer, 60 to 80 wt % of a monounsaturated ester of (meth)acrylic acid with an alkyl radical, and 16 to 39 wt % of a vinylaromatic monomer, and
- a mixture (C) of 8 to 15 wt % of an alpha-beta unsaturated carboxylic acid, 10 to 20 wt % of a monounsaturated ester of (meth)acrylic acid with an alkyl radical substituted by a hydroxyl group, and 65 to 82 wt % of monounsaturated esters of (meth)acrylic acid with an alkyl radical, where
i. first the mixture (A) is polymerized,
ii. then the mixture (B) is polymerized in the presence of the polymer prepared under i., and
iii. thereafter the mixture (C) is polymerized in the presence of the polymer prepared under ii.

The above figures in wt % are based in each case on the total weight of the mixture (A) or (B) or (C), respectively.

The anionically stabilized polymer (asP) in dispersion in water, in other words the aqueous dispersion of this polymer (asP), advantageously has a defined electrophoretic mobility. It is therefore preferred in accordance with the invention if the anionically stabilized polymer (asP) in dispersion in water has at a pH of 8.0 an elektrophoretic mobility of −2.5 to −4 (μm/s)/(V/cm).

Moreover, the coating composition may comprise the anionically stabilized polymer (asP) in a total amount of 1 to 30 wt %, preferably of 5 to 20 wt %, more particularly of 5 to 10 wt %, based in each case on the overall solids content of the coating composition. The use of the anionically stabilized polymer (asP) in the aforesaid total amounts, in combination with the at least one polycarboxylic acid PC, leads to a high flop index. Moreover, the use of this binder leads to effective fixing of the oriented effect particles EP during the flashing of the coating composition of the invention, so that the high flop index is not adversely affected even on application of further layers of coating composition.

The coating composition of the invention, as anionically stabilized binder BM, may comprise at least one above-described anionically stabilized polymer (asP) or the above-described anionically stabilized polyurethane-polyurea particles (PPP). Preferably the coating composition comprises as anionically stabilized binder BM at least one above-described anionically stabilized polymer (asP) and also the above-described anionically stabilized polyurethane-polyurea particles (PPP). With particular preference these polymers are present in a certain weight ratio in the composition. It is therefore advantageous in accordance with the invention if the aqueous coating composition has a weight ratio of the anionically stabilized polymer (asP) to the anionically stabilized polyurethane-polyurea particles (PPP) of 1:10 to 1:1, more particularly of 1:6 to 1:4. The use of the aforesaid weight ratios of the anionically stabilized binders BM, in combination with the polycarboxylic acid PC, has proven particularly advantageous in relation to the high flop index. Moreover, the use of this binder combination leads to particularly effective fixing of the effect particle orientation during flashing and therefore also allows the coating composition of the invention to be used in "wet-on-wet" processes, without an adverse effect on the orientation of the effect particles.

The coating composition of the invention, besides the at least one anionically stabilized binder BM, may comprise at least one further binder, more particularly at least one polymer selected from the group consisting of polyurethanes, polyesters, polyacrylates and/or copolymers of the stated polymers, more particularly polyesters and/or polyurethane polyacrylates. This further binder is different from the anionically stabilized binder BM. Preferred polyesters are described, for example, in DE 4009858 A1 in column 6, line 53 to column 7, line 61 and column 10, line 24 to column 13, line 3, and in WO 2014/033135 A1 at page 28, lines 13 to 33. The described polymers as binders are preferably hydroxy-functional and especially preferably possess an OH number in the range from 20 to 200 mg KOH/g, more preferably from 50 to 150 mg KOH/g. Used more preferably are at least two mutually different hydroxy-functional polyesters as further binder.

Effect Pigment EP (b):

As a second essential constituent (b), the coating composition of the invention comprises at least one effect pigment EP.

The effect pigment EP is preferably selected from the group of lamellar aluminum pigments, aluminum pigments of "cornflake" and/or "silver dollar" form, aluminum pigments coated with organic pigments (available commercially under the brand name "Friend Color®" from Toyal, for example), glass flakes (available commercially under the brand name "Luxan®)" from Eckart, for example), glass flakes coated with interference layers, gold bronzes, oxidized bronzes, iron oxide-aluminum pigments, pearlescent pigments, metal oxide-mica pigments, lamellar graphite, platelet-shaped iron oxide, multilayer effect pigments composed of PVD films, and mixtures thereof, more particularly lamellar aluminum pigments.

In this context it has proven particularly advantageous if passivated lamellar aluminum pigments are used. An assurance may thus be given of high storage stability on the part of the aqueous coating compositions of the invention. Preferably, therefore, the lamellar aluminum pigments are treated with a passivating agent, the passivating agent being selected from the group of silanes, organic polymers, chromium compounds, phosphoric acid derivatives, molybdenum derivatives, and mixtures thereof, especially chromium compounds. Derivatives in this context are compounds in which an H atom or a functional group has been replaced by another atom or another group of atoms, and/or in which one or more atoms/groups of atoms have been removed.

Moreover, it has proven advantageous in this context if the lamellar aluminum pigments have a defined platelet thickness and average particle size. The lamellar aluminum pigments preferably have a platelet thickness of 200 to 500 nm and an average particle size $D_{50}$ of 10 to 25 µm, more particularly 10 to 20 µm (for measurement method, see Examples section).

The at least one effect pigment EP is used preferably in a particular total amount. In preferred embodiments of the first subject of the invention, therefore, the aqueous coating composition comprises the at least one effect pigment EP, more particularly lamellar aluminum pigments, in a total amount of 1 to 20 wt %, preferably of 2 to 15 wt %, more preferably of 2.5 to 10 wt %, more particularly of 3 to 7 wt %, based in each case on the total weight of the coating composition. The use of the effect pigments, especially of the above-described lamellar aluminum pigments, in the stated total amounts, in combination with the at least one anionically stabilized binder BM and also the at least one polycarboxylic acid PC, leads to a particularly high flop index, though without detriment to the other optical and coloristic properties of the coating.

Polycarboxylic Acid PC (c):

As a third essential constituent, the aqueous coating composition of the invention comprises at least one polycarboxylic acid PC.

The at least one polycarboxylic acid preferably has a melting point of 80 to 165° C., more preferably of 85 to 150° C., preferably of 90 to 140° C., more particularly of 95 to 120° C. The use of polycarboxylic acids PC having the aforesaid melting points in combination with the at least one anionically stabilized binder BM leads to a particularly high flop index.

The at least one polycarboxylic acid PC is more preferably a dicarboxylic acid. Dicarboxylic acids in accordance with the invention are compounds which have precisely two carboxylic acid groups per molecule.

In this context it is especially preferred if the dicarboxylic acid has the general formula (I)

$$K^+ {}^-OOC-(CH_2)_x-COO^- K^+$$

in which
x stands for integers from 0 to 30, preferably from 4 to 30, more preferably from 4 to 20, even more preferably from 4 to 8, more particularly 7, and $K^+$ is hydrogen or a cation.

Furthermore, in this context it is very especially preferred if the dicarboxylic acid has the general formula (Ia)

$$K^+ {}^-OOC-R-COO^- K^+ \qquad (Ia)$$

in which
R is a linear or branched unsaturated $C_{10}$-$C_{72}$-alkyl group, a cycloalkyl group or an aromatic group, and
$K^+$ is hydrogen or a cation.

Preferably $K^+$ is a cation. More preferably $K^+$ is a base used for the at least partial neutralization of the polycarboxylic acid PC. Very preferably it is cationic dimethylethanolamine. The use of the above-recited dicarboxylic acids, especially of azelaic acid, has proven to be particularly advantageous, in combination with the at least one anionically stabilized binder BM, for the attainment of a high flop index, but without leading to reduced storage stability on the part of the aqueous coating composition or an adverse influence on the optical and coloristic properties of the coatings produced from these compositions. Polycarboxylic acids used in accordance with the invention are available commercially, for example, from Merck.

The at least one polycarboxylic acid PC is preferably used in a particular total amount. It is therefore particularly preferred in accordance with the invention if the aqueous coating composition comprises the at least one polycarboxylic acid PC, more particularly the dicarboxylic acid in formula (I) or (Ia), in a total amount of 0.1 to 5 wt %, preferably of 0.25 to 4 wt %, more preferably of 0.25 to 3 wt %, more particularly of 0.25 to 1 wt %, based in each case on the total weight of the coating composition. The use of the polycarboxylic acid PC, especially of the above-described dicarboxylic acid of formula (I), in the stated total amounts, in combination with the at least one anionically stabilized binder BM, leads to a particularly high flop index but without detriment to the good optical and coloristic properties of the coating.

Solvent L (d):

As a fourth essential constituent, the aqueous coating composition of the invention comprises at least one solvent L. This solvent L serves in particular for solubilizing the at least one polycarboxylic acid PC and so permits homogeneous incorporation of the polycarboxylic acid and also high storage stability on the part of the composition of the invention.

The at least one solvent L is preferably selected from water, alkoxy-$C_2$-$C_{10}$ alcohols, ketones, esters, amides, methylal, butylal, 1,3-dioxolane, glycerol formal and mixtures thereof, especially 1-methoxy-2-propanol and/or water. The use of water and/or 1-methoxy-2-propanol in particular for solubilizing the polycarboxylic acid PC has proven advantageous in terms of homogeneous incorporation and also the storage stability of the compositions of the invention.

The at least one solvent L is preferably present in a defined total amount. It is therefore advantageous in accordance with the invention if the aqueous coating composition comprises the at least one solvent L, more particularly 1-methoxy-2-propanol and/or water, in a total amount of 0.3 to 30 wt %, preferably of 1.5 to 30 wt %, more preferably from 3 to 18 wt %, more particularly of 6 to 18 wt %, based in each case on the total weight of the coating composition. The use of the aforesaid amounts of the at least one solvent L, more particularly of 1-methoxy-2-propanol and/or water, leads to sufficient solubilization of the at least one polycarboxylic acid PC in the aqueous coating composition and in this way ensures excellent effect particle orientation, i.e., a high flop index, and also high storage stability. Moreover, it enables homogeneous incorporation of the polycarboxylic acid PC into the aqueous coating composition.

Further Constituents (e):

The aqueous coating composition of the invention, besides the above-recited mandatory constituents (a) to (d), may also comprise further constituents, selected from the group of neutralizing agents, thickeners, crosslinking agents, fillers, color pigments, and mixtures thereof.

The neutralizing agent is preferably selected from the group of inorganic bases, primary amines, secondary amines, tertiary amines, and mixtures thereof, especially dimethylethanolamine. The neutralizing agent, especially dimethylethanolamine, is used with particular preference for neutralizing the at least one polycarboxylic acid PC. In this way the solubility of the polycarboxylic acid PC in the aqueous coating composition can be increased.

It is preferred in this context if the at least one neutralizing agent, especially dimethylethanolamine, is present in a total amount of 0.25 to 5 wt %, preferably of 0.3 to 4 wt %, more preferably of 0.5 to 3 wt %, more particularly of 1 to 3 wt %, based in each case on the total weight of the coating composition. The use of the neutralizing agent, especially dimethylethanolamine, in the quantity ranges recited above, in combination with the at least one solvent L, ensures sufficient solubilization of the polycarboxylic acid PC and hence provides an assurance of homogeneous incorporation and also high storage stability on the part of the coating compositions of the invention.

The thickener is preferably selected from the group of phyllosilicates, (meth)acrylic acid-(meth)acrylate copolymers, hydrophobically modified ethoxylated polyurethanes, hydrophobically modified polyethers, hydroxyalkylcelluloses, polyamides, and mixtures thereof, especially (meth)acrylic acid-(meth)acrylate copolymers and/or hydrophobically modified ethoxylated polyurethanes. (Meth)acrylic acid-(meth)acrylate copolymers are obtainable by reaction of (meth)acrylic acid with (meth)acrylic esters. Depending on the length of the carbon chain in the (meth)acrylic esters, these copolymers have an associative thickening effect (ASE or HASE thickeners). Copolymers containing exclusively $C_1$-$C_4$ alkyl(meth)acrylates do not have an associative thickening effect (ASE thickeners). Conversely, copolymers which contain (meth)acrylates having a chain length of more than four carbon atoms do possess an associative thickening effect (HASE thickeners). Hydrophobically modified ethoxylated polyurethanes are obtainable by reaction of a diisocyanate with a polyether and subsequent reaction of this prepolymer with a hydrophobic alcohol. Such polyurethanes are also referred to as HEUR thickeners. Particularly preferred is the use of a combination of non-associative thickening (meth)acrylic acid-(meth)acrylate copolymers and hydrophobically modified ethoxylated polyurethanes.

It is preferred in this context if the at least one thickener, more particularly (meth)acrylic acid-(meth)acrylate copolymers and/or hydrophobically modified ethoxylated polyurethanes, is present in a total amount of 0.015 to 3 wt %, preferably of 0.03 to 2 wt %, more preferably of 0.04 to 1 wt %, more particularly of 0.05 to 0.7 wt %, based in each case on the total weight of the coating composition.

According to one particularly preferred embodiment of the present invention, the aqueous coating composition comprises no phyllosilicates and/or polyamides, more particularly no phyllosilicates and no polyamides. This means that the phyllosilicates and/or polyamides, more particularly phyllosilicates and polyamides, are present in a total amount of 0 wt %, based on the total weight of the coating composition. Surprisingly, the use of a polycarboxylic acid PC without additional use of polyamides and/or phyllosilicates leads to a flop index which is comparable with the use of polyamides and/or phyllosilicates. When the at least one polycarboxylic acid PC is used, however, there are no unwanted separation phenomena and no reduced shear stability.

The crosslinking agent is preferably selected from the group of melamine-formaldehyde resins, polyisocyanates, blocked polyisocyanates, polycarbodiimides and mixtures thereof, especially melamine-formaldehyde resins.

It is preferred in this context if the at least one crosslinking agent, especially melamine-formaldehyde resin, is present in a total amount of 1 to 10 wt %, preferably of 2 to 6 wt %, more preferably of 3 to 5 wt %, more particularly of 4 to 6 wt %, based in each case on the total weight of the coating composition. The aforesaid total quantities ensure sufficient crosslinking of the aqueous coating composition.

The filler and/or the pigment is preferably selected from the group of titanium dioxide, barium sulfate, fumed silicas, talc, carbon black, iron manganese black, spinel black, ultramarine green, manganese blue, ultramarine violet, manganese violet, red iron oxide, molybdate red, ultramarine red, brown iron oxide, mixed brown, monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black and also mixtures thereof, especially barium sulfate and/or talc.

It is preferred in this context if the at least one filler and/or the at least one pigment, especially barium sulfate and/or talc, is or are present in a total amount of 0.1 to 6 wt %, preferably of 0.5 to 5 wt %, more preferably of 0.8 to 4 wt %, more particularly of 1 to 3 wt %, based in each case on the total weight of the coating composition.

The coating composition of the invention has a relatively high solids content in spite of the use of polycarboxylic acid PC. It is therefore preferred if the composition has a solids content of 10 to 50 wt %, preferably of 15 to 35 wt %, more particularly of 20 to 30 wt %, based in each case on the total weight of the coating composition and measured according to DIN EN ISO 3251 (June 2008). In light of the high solids content, the coating compositions of the invention have a good environmental profile without any adverse effect, though, on their storage stability. The storage stability can be described for example by viscosity measurements in the liquid state over time.

The coating composition of the invention preferably has a pH of 7 to 10, more particularly of 7 to 9, measured in each case at 23° C.

The coating composition of the invention is preferably obtained by adding a solution (LG) to an aqueous composition comprising at least one anionically stabilized binder BM and also an effect pigment EP. The solution LG comprises the at least one polycarboxylic acid PC, which is in solution in the solvent L and is optionally at least partially neutralized with at least one neutralizing agent.

Preparation of the solution (LG) ensures homogeneous incorporation of the polycarboxylic acid PC. Moreover, this solution (LG) is stable in storage and as an intermediate can therefore be integrated easily into the preparation of the aqueous coating compositions.

Regarding the polycarboxylic acid PC, the solvent L, the anionically stabilized binder BM, the effect pigment, and the neutralizing agent, the observations above made in relation to the coating composition of the invention are valid correspondingly.

Method of the Invention

In the method of the invention, a multicoat paint system is built up on a substrate (S).

With preference in accordance with the invention, the substrate (S) is selected from metallic substrates, plastics, and mixtures thereof, more particularly from metallic substrates.

Metallic substrates (S) contemplated essentially include substrates comprising or consisting of, for example, iron, aluminum, copper, zinc, magnesium, and alloys thereof, and also steel, in any of a very wide variety of forms and compositions. Preferred substrates are those of iron and steel, especially being typical iron and steel substrates as used in the automotive industry sector. Before step (1) of the method of the invention, the metallic substrates (S) may be pretreated in a conventional way—that is, for example, cleaned and/or provided with known conversion coatings.

Suitable plastics substrates (S) are in principle substrates comprising or consisting of (i) polar plastics, such as polycarbonate, polyamide, polystyrene, styrene copolymers, polyesters, polyphenylene oxides, and blends of these plastics, (ii) reactive plastics, such as PUR-RIM, SMC, BMC, and also (iii) polyolefin substrates of the polyethylene and polypropylene types with a high rubber content, such as PP-EPDM, and also surface-activated polyolefin substrates. The plastics may also be fiber-reinforced, more particularly using carbon fibers and/or metal fibers. Substrates of plastic (S) as well may be pretreated, more particularly by cleaning, before step (1) of the method of the invention, in order to improve the adhesion of the first coat (S1).

As substrates (S) it is also possible, moreover, to use those which contain both metallic and plastics fractions. Substrates of this kind are, for example, vehicle bodies containing plastics parts.

Step (1):

In step (1) of the method of the invention, a cured first coat (S1) may be produced on the substrate (S) by application of a composition (Z1) to the substrate (S) and optional subsequent curing.

The composition (Z1) may be an electrocoat material and may also be a primer coat. A primer coat in accordance with the invention, however, is not the basecoat applied in step (2) of the method of the invention. The method of the invention is preferably carried out with metallic substrates (S). The first coat (S1), therefore, is more particularly a cured electrocoat (E1). In one preferred embodiment of the method of the invention, accordingly, the composition (Z1) is an electrocoat material (ETL1) which is applied electrophoretically to the substrate (S). Suitable electrocoat materials (ETL1) and also their curing are described in WO 2017/088988 A1, for example.

Step (2):

In step (2) of the method of the invention, a basecoat film (BL2a) is produced (Alternative 1), or two or more directly consecutive basecoat films (BL2-x) are produced (Alternative 2). The films are produced by application of an aqueous basecoat material (also called waterborne basecoat material) (bL2a) directly to the substrate (S) or directly to the cured coat (S1), or by directly consecutive application of two or more basecoat materials (bL2-x) to the substrate (S) or to the cured coat (S1). After having been produced, therefore, the basecoat film (BL2a) according to Alternative 1 of step (2) is disposed directly on the substrate (S) or directly on the cured first coat (S1).

The directly consecutive application of two or more basecoat materials (bL2-x) to the cured first coat (S1) (Alternative 2) is understood as follows:

The application of the first basecoat material (bL2-a) produces a basecoat film (BL2-a) directly on the cured first coat (S1). The at least one further basecoat film (BL2-x) is then produced directly on the basecoat film (BL2-a). Where two or more further basecoat films (BL2-x) are produced, they are produced directly consecutively. For example, precisely one further basecoat film (BL2-x) can be produced, which in that case, in the multicoat paint system ultimately produced, is disposed directly below the clearcoat (K) and can therefore be referred to as basecoat film (BL2-z). Also possible, for example, is for two further basecoat films (BL2-x) to be produced, in which case the film produced directly on the basecoat film (BL2-a) can be referred to as (BL2-b), and the film, finally, disposed directly below the clearcoat (K) can be referred to in turn as (BL2-z). In this variant it may be preferable for the basecoat film (BL2-a) produced directly on the substrate (S) or directly on the cured first coat (S1) to be based on a color-preparatory basecoat material (bL2-a). The second and the optional third film are based either on the same color- and/or effect-imparting basecoat material (bL2-b) and (bL2-z), or on a first color- and/or effect-imparting basecoat material (bL2-b) and on a different, second color- and/or effect-imparting basecoat material (bL2-z). In this case the coating composition of the invention is used as basecoat material (bL2-b) and/or (bL2-z).

The basecoat materials (bL2-x) may be identical or different. It is also possible to produce two or more basecoat films (BL2-x) with the same basecoat material, and one or more further basecoat films (BL2-x) with one or more other basecoat materials. At least one of the aqueous basecoat materials (bL2a) and (bL2-x) used in step (2), however, comprises the aqueous coating composition of the invention and/or an aqueous coating composition comprising at least one anionically stabilized binder BM and at least one effect pigment EP, which is mixed directly before application with at least one polycarboxylic acid PC and at least one solvent.

Embodiments preferred in the context of the present invention encompass, according to Alternative 1 of step (2) of the method of the invention, the production of a basecoat film (BL2a).

The basecoat films (BL2a) and (BL2-x) are cured not separately but rather together with the clearcoat material. In particular, the coating compositions as used in step (2) of the method of the invention are not cured separately like the coating compositions referred to as surfacers in the context of the standard method. The basecoat films (BL2a) and (BL2-x) are therefore preferably not exposed to temperatures of above 100° C. for a time of longer than 1 minute, and with particular preference are not exposed at all to temperatures of more than 100° C.

The basecoat materials (bL2a) and (bL2-x) are applied such that, after the curing in step (4), the basecoat film (BL2a) and the individual basecoat films (BL2-x) each have a film thickness of, for example, 5 to 50 micrometers, preferably 6 to 40 micrometers, especially preferably 7 to 35 micrometers. In the first alternative of step (2), preference is given to producing basecoat films (BL2a) having relatively high film thicknesses of 15 to 50 micrometers, preferably 20 to 45 micrometers. In the second alternative of step (2), the individual basecoat films (BL2-x) tend to have film thicknesses which are lower by comparison, with the overall system then again having film thicknesses which lie within the order of magnitude of the one basecoat film (BL2a). In the case of two basecoat films, for example, the first basecoat film (BL2-a) preferably has film thicknesses of 5 to 35 micrometers, more particularly 10 to 30 micrometers, the second basecoat film (BL2-z) preferably has film thicknesses of 5 to 35 micrometers, more particularly 10 to 30 micrometers, and the overall film thickness does not exceed 50 micrometers.

Step (3):

In step (3) of the method of the invention, a clearcoat film (K) is produced directly on the basecoat film (BL2a) or on the topmost basecoat film (BL2-z). This production is accomplished by corresponding application of a clearcoat material (k). Suitable clearcoat materials are described for example in WO 2006042585 A1, WO 2009077182 A1 or else WO 2008074490 A1.

The clearcoat material (k) or the corresponding clearcoat film (K), following application, is flashed and/or interim-dried preferably at 15 to 35° C. for a time of 0.5 to 30 minutes.

The clearcoat material (k) is applied in such a way that the film thickness of the clearcoat film after the curing in step (4) is from, for example, 15 to 80 micrometers, preferably 20 to 65 micrometers, especially preferably 25 to 60 micrometers.

Step (4):

In step (4) of the method of the invention, there is joint curing of the basecoat film (BL2a) and of the clearcoat film (K), or of the basecoat films (BL2-x) and of the clearcoat film (K).

The joint curing takes place preferably at temperatures of 100 to 250° C., preferably 100 to 180° C., for a duration of 5 to 60 minutes, preferably 10 to 45 minutes.

The method of the invention allows the production of multicoat paint systems on substrates without a separate curing step. Nevertheless, the multicoat paint systems resulting from application of the method of the invention have a high flop index and also good optical and coloristic properties. As a result of the subsequent color matching by the addition of a mixture of polycarboxylic acid PC and solvent L directly before application of the basecoat during production of the multicoat paint system, the addition being made, for example, in the circuit line on an automotive manufacturing line, it becomes possible to continue to use basecoat compositions which because of the deviation in shade are outside specification and would therefore have to be disposed of. The addition of the at least one polycarboxylic acid PC in combination with the at least one solvent L for color matching of basecoat compositions already produced therefore also increases the environmental balance and efficiency of the method of the invention.

In respect of further preferred embodiments of the method of the invention, especially in respect of the basecoat compositions used therein and of the components of these basecoat compositions, the statements made in relation to the coating composition of the invention are valid mutatis mutandis.

Multicoat Paint System of the Invention:

After the end of step (4) of the method of the invention, the result is a multicoat paint system of the invention.

With particular preference the surface of this multicoat paint system has a flop index of 11 to 30, preferably of 12 to 30, more particularly of 12.5 to 30. This high flop index is achieved through combination of at least one anionically stabilized binder BM with at least one polycarboxylic acid PC, despite the preferred absence of polyamides and/or phyllosilicates. The latter are used in the prior art to raise the flop index. The flop index achieved with the composition of the invention is comparable in this context with that of compositions which do include polyamides and/or phyllosilicates.

In respect of further preferred embodiments of the multicoat paint system of the invention, the comments made regarding the coating composition of the invention and also regarding the method of the invention are valid mutatis mutandis.

Inventive Uses

A further subject of the present invention is the use of at least one polycarboxylic acid PC in an aqueous coating composition comprising at least one anionically stabilized binder BM and at least one effect pigment EP for improving the effect pigment orientation, the improvement being achieved relative to aqueous coating compositions free from polycarboxylic acid.

It is preferred in accordance with the invention here if at least one polycarboxylic acid PC and at least one solvent L are used for improving the effect pigment orientation. More preferably both the polycarboxylic acid PC and the solvent L, as a mixture, are used.

Through the use of the at least one polycarboxylic acid PC, even in the absence of polyamides and/or phyllosilicates that are used in the prior art for raising the flop index, a high flop index is achieved.

This flop index is comparable with the flop index achieved when using polyamides and/or phyllosilicates, but without any incompatibilities or adverse effects on the shear stability arising.

A last subject of the present invention is the use of at least one polycarboxylic acid PC in an aqueous coating composition comprising at least one binder BM and at least one effect pigment EP for color matching.

It is preferred in accordance with the invention here if at least one polycarboxylic acid PC and at least one solvent L are used for color matching. More preferably both the polycarboxylic acid PC and the solvent L, as a mixture, are used.

The subsequent color matching obviates the need for disposal of aqueous coating compositions which directly after production or because of storage are outside specification and would therefore have to be disposed of. This results in an improved environmental balance and efficiency of basecoat production and also of the production of paint systems using these coating compositions.

In respect of further preferred embodiments of the inventive uses, especially in respect of the polycarboxylic acid PC, the solvent L and the components of the aqueous coating composition that are used, the comments made in relation to the coating composition of the invention, to the method of the invention, and to the multicoat paint system of the invention are valid mutatis mutandis.

The invention is described in particular by the following embodiments:

According to a first embodiment, the present invention relates to an aqueous coating composition comprising
(a) at least one anionically stabilized binder BM,
(b) at least one effect pigment EP,
(c) at least one polycarboxylic acid PC, and
(d) at least one solvent L.

According to a second embodiment, the present invention relates to an aqueous coating composition according to embodiment 1, wherein the at least one anionically stabilized binder BM at a pH of 8.0 has an electrophoretic mobility of −2.5 to −15 (µm/s)/(V/cm), preferably of −2.5 to −10 (µm/s)/(V/cm), more preferably of −4 to −8 (µm/s)/(V/cm), more particularly of −5 to −8 (µm/s)/(V/cm).

According to a third embodiment, the present invention relates to an aqueous coating composition according to either of embodiments 1 and 2, wherein the at least one anionically stabilized binder BM is present in a total amount of 20 to 80 wt %, preferably of 30 to 70 wt %, more particularly of 40 to 70 wt %, based in each case on the overall solids content of the coating composition.

According to a fourth embodiment, the present invention relates to an aqueous coating composition according to any of the preceding embodiments, wherein the anionically stabilized binder comprises anionically stabilized polyurethane-polyurea particles (PPP) in dispersion in water and having an average particle size of 40 to 2000 nm and a gel fraction of at least 50%, the anionically stabilized polyurethane-polyurea particles comprising, in each case in reacted form,
(Z.1.1) at least one isocyanate group-containing polyurethane prepolymer containing groups which are anionic and/or can be converted into anionic groups, and
(Z.1.2) at least one polyamine containing two primary amino groups and one or two secondary amino groups.

According to a fifth embodiment, the present invention relates to an aqueous coating composition according to embodiment 4, wherein the polyurethane-polyurea particles (PPP) have an average particle size of 110 to 500 nm, more particularly of 130 to 250 nm, and a gel fraction of 60% to 100%, preferably of 70% to 100%, more particularly of 80% to 100%.

According to a sixth embodiment, the present invention relates to an aqueous coating composition according to either of embodiments 4 and 5, wherein the prepolymer (Z.1.1) comprises carboxylic acid groups.

According to a seventh embodiment, the present invention relates to an aqueous coating composition according to any of embodiments 4 to 6, wherein the prepolymer (Z.1.1) comprises at least one polyesterdiol prepared using diols and dicarboxylic acids, with at least 50 wt %, preferably 55 to 75 wt %, of the dicarboxylic acids used in preparing the polyester diols being dimer fatty acids.

According to an eighth embodiment, the present invention relates to an aqueous coating composition according to any of embodiments 4 to 7, wherein the polyamine (Z.1.2) consists of one or two secondary amino groups, two primary amino groups, and aliphatic saturated hydrocarbon groups.

According to a ninth embodiment, the present invention relates to an aqueous coating composition according to any of embodiments 4 to 8, wherein the at least one polyamine (Z.1.2) is selected from the group consisting of diethylenetriamine, 3-(2-aminoethyl)aminopropylamine, dipropylenetriamine, N1-(2-(4-(2-aminoethyl)piperazin-1-yl)ethyl)ethane-1,2-diamine, triethylenetetramine, and N,N'-bis(3-aminopropyl)ethylenediamine.

According to a tenth embodiment, the present invention relates to an aqueous coating composition according to any of embodiments 4 to 9, wherein the anionically stabilized polyurethane-polyurea particles (PPP) in dispersion in water have, at a pH of 8.0, an electrophoretic mobility of −6 to −8 (µm/s)/(V/cm).

According to an eleventh embodiment, the present invention relates to an aqueous coating composition according to any of embodiments 4 to 10, wherein the aqueous coating composition comprises the polyurethane-polyurea particles (PPP) in a total amount of 10 to 50 wt %, preferably of 50 to 45 wt %, more particularly of 23 to 40 wt %.

According to a twelfth embodiment, the present invention relates to an aqueous coating composition according to any of the preceding embodiments, wherein the at least one anionically stabilized binder BM is at least one anionically stabilized polymer (asP) in dispersion in water and having an average particle size of 100 to 500 nm, the preparation of the anionically stabilized polymer comprising the consecutive radical emulsion polymerization of three mixtures (A), (B), and (C) of olefinically unsaturated monomers, where
the mixture (A) comprises at least 50 wt % of vinylaromatic monomers, and a polymer prepared from the mixture (A) possesses a glass transition temperature of 10 to 65° C.,
the mixture (B) comprises at least one polyunsaturated monomer, and a polymer prepared from the mixture (B) possesses a glass transition temperature of −35 to 15° C., and
the mixture (C) comprises at least one anionic monomer, and a polymer prepared from the mixture (C) possesses a glass transition temperature of −50 to 15° C.,
and where
i. first the mixture (A) is polymerized,
ii. then the mixture (B) is polymerized in the presence of the polymer prepared under i., and
iii. thereafter the mixture (C) is polymerized in the presence of the polymer prepared under ii.

According to a thirteenth embodiment, the present invention relates to an aqueous coating composition according to embodiment 12, wherein the fraction of the monomer mixture (A) is from 0.1 to 10 wt %, the fraction of the monomer mixture (B) is from 60 to 80 wt %, and the fraction of the monomer mixture (C) is from 10 to 30 wt %, based in each case on the sum of the individual amounts of the mixtures (A), (B), and (C).

According to a fourteenth embodiment, the present invention relates to an aqueous coating composition according to either of embodiments 12 and 13, wherein the monomer mixture (A) comprises at least one monounsaturated ester of (meth)acrylic acid with an alkyl radical and at least one monoolefinically unsaturated monomer containing vinyl groups, with a radical arranged on the vinyl group that is aromatic or that is a mixed saturated aliphatic-aromatic radical, in which case the aliphatic fractions of the radical are alkyl groups.

According to a fifteenth embodiment, the present invention relates to an aqueous coating composition according to any of embodiments 12 to 14, wherein the monomer mixture (B), besides the at least one polyolefinically unsaturated monomer, also comprises at least one monounsaturated ester of (meth)acrylic acid with an alkyl radical and at least one monoolefinically unsaturated monomer containing vinyl groups, with a radical arranged on the vinyl group that is aromatic or that is a mixed saturated aliphatic-aromatic radical, in which case the aliphatic fractions of the radical are alkyl groups.

According to a sixteenth embodiment, the present invention relates to an aqueous coating composition according to any of embodiments 12 to 15, wherein the monomer mixture (B), as polyolefinically unsaturated monomers, comprises exclusively diolefinically unsaturated monomers.

According to a seventeenth embodiment, the present invention relates to an aqueous coating composition according to any of embodiments 12 to 16, wherein the monomer mixtures (A) and (B) contain no hydroxy-functional monomers and no acid-functional monomers.

According to an eighteenth embodiment, the present invention relates to an aqueous coating composition according to any of embodiments 12 to 17, wherein the monomer mixture (C) comprises at least one α,β-unsaturated carboxylic acid, at least one monounsaturated ester of (meth)acrylic acid with an alkyl radical substituted by a hydroxyl group, and at least one monounsaturated ester of (meth)acrylic acid with an alkyl radical.

According to a nineteenth embodiment, the present invention relates to an aqueous coating composition according to any of embodiments 12 to 18, wherein the metered addition of the olefinically unsaturated monomers in stages i. to iii. is made such that a fraction of free monomers in the reaction solution does not exceed 6.0 wt %, based on the total amount of the monomers used in the respective polymerization stage, throughout the reaction time.

According to a twentieth embodiment, the present invention relates to an aqueous coating composition according to any of embodiments 12 to 19, wherein the anionically stabilized polymer (asP) possesses an average particle size of 100 to 500 nm, preferably 125 to 400 nm, very preferably of 130 to 300 nm, and a glass transition temperature Tg of −20 to −5° C.

According to a twenty-first embodiment, the present invention relates to an aqueous coating composition according to any of embodiments 12 to 20, wherein the anionically stabilized polymer (asP) in dispersion in water has, at a pH of 8.0, an electrophoretic mobility of −2.5 to −4 (µm/s)/(V/cm).

According to a twenty-second embodiment, the present invention relates to an aqueous coating composition according to any of embodiments 12 to 21, wherein the aqueous coating composition comprises the anionically stabilized polymer (asP) in a total amount of 1 to 30 wt %, preferably of 5 to 20 wt %, more particularly of 5 to 10 wt %.

According to a twenty-third embodiment, the present invention relates to an aqueous coating composition according to any of embodiments 4 to 22, wherein the aqueous coating composition has a weight ratio of the anionically stabilized polymer (asP) to the anionically stabilized polyurethane-polyurea particles (PPP) of 1:10 to 1:1, more particularly of 1:6 to 1:4.

According to a twenty-fourth embodiment, the present invention relates to an aqueous coating composition according to any of the preceding embodiments, wherein the at least one effect pigment EP is selected from the group of lamellar aluminum pigments, aluminum pigments of "cornflake" and/or "silver dollar" form, aluminum pigments coated with organic pigments, glass flakes, glass flakes coated with interference layers, gold bronzes, oxidized bronzes, iron oxide-aluminum pigments, pearlescent pigments, metal oxide-mica pigments, lamellar graphite, platelet-shaped iron oxide, multilayer effect pigments composed of PVD films, and mixtures thereof, especially lamellar aluminum pigments.

According to a twenty-fifth embodiment, the present invention relates to an aqueous coating composition according to embodiment 24, wherein the lamellar aluminum pigments are treated with a passivating agent, the passivating agent being selected from the group of silanes, organic polymers, chromium compounds, phosphoric acid derivatives, molybdenum derivates, and mixtures thereof, especially chromium compounds.

According to a twenty-sixth embodiment, the present invention relates to an aqueous coating composition according to either of embodiments 24 and 25, wherein the lamellar aluminum pigments have a platelet thickness of 200 to 500 nm and an average particle size $D_{50}$ of 10 to 25 µm, more particularly 10 to 20 µm.

According to a twenty-seventh embodiment, the present invention relates to an aqueous coating composition according to any of the preceding embodiments, wherein the aqueous coating composition comprises the at least one effect pigment EP, more particularly lamellar aluminum pigments, in a total amount of 1 to 20 wt %, preferably of 2 to 15 wt %, more preferably of 2.5 to 10 wt %, more particularly of 3 to 7 wt %, based in each case on the total weight of the coating composition.

According to a twenty-eighth embodiment, the present invention relates to an aqueous coating composition according to any of the preceding embodiments, wherein the at least one polycarboxylic acid has a melting point of 80 to 165° C., preferably of 85 to 150° C., more preferably of 90 to 140° C., more particularly of 95 to 120° C.

According to a twenty-ninth embodiment, the present invention relates to an aqueous coating composition according to any of the preceding embodiments, wherein the at least one polycarboxylic acid PC is a dicarboxylic acid.

According to a thirtieth embodiment, the present invention relates to an aqueous coating composition according to embodiment 29, wherein the dicarboxylic acid has the general formula (I)

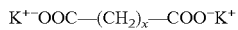

in which
x stands for integers from 4 to 30, preferably from 4 to 20, more preferably from 4 to 8, more particularly 7, and
$K^+$ is hydrogen or a cation.

According to a thirty-first embodiment, the present invention relates to an aqueous coating composition according to embodiment 29, wherein the dicarboxylic acid has the general formula (Ia)

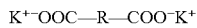

in which
R is a linear or branched unsaturated $C_{10}$-$C_{72}$-alkyl group, a cycloalkyl group or an aromatic group, and
$K^+$ is hydrogen or a cation.

According to a thirty-second embodiment, the present invention relates to an aqueous coating composition according to any of the preceding embodiments, wherein the aqueous coating composition comprises the at least one polycarboxylic acid PC, more particularly the dicarboxylic acid of the formula (I) or (Ia), in a total amount of 0.1 to 5 wt %, preferably of 0.25 to 4 wt %, more preferably of 0.25 to 3 wt %, more particularly of 0.25 to 1 wt %, based in each case on the total weight of the coating composition.

According to a thirty-third embodiment, the present invention relates to an aqueous coating composition according to any of the preceding embodiments, wherein the at least one solvent L is selected from water, alkoxy-$C_2$-$C_{10}$ alcohols, ketones, esters, amides, methylal, butylal, 1,3-dioxolane, glycerol formal, and mixtures thereof, more particularly water and/or 1 methoxy-2-propanol.

According to a thirty-fourth embodiment, the present invention relates to an aqueous coating composition according to any of the preceding embodiments, wherein the aqueous coating composition comprises the at least one solvent L, more particularly 1-methoxy-2-propanol, in a total amount of 0.3 to 30 wt %, preferably of 1.5 to 30 wt %, more preferably of 3 to 18 wt %, more particularly of 6 to 18 wt %, based in each case on the total weight of the coating composition.

According to a thirty-fifth embodiment, the present invention relates to an aqueous coating composition according to any of the preceding embodiments, which additionally comprises at least one neutralizing agent.

According to a thirty-sixth embodiment, the present invention relates to an aqueous coating composition according to embodiment 35, wherein the neutralizing agent is selected from the group of inorganic bases, primary amines, secondary amines, tertiary amines and mixtures thereof, more particularly dimethylethanolamine.

According to a thirty-seventh embodiment, the present invention relates to an aqueous coating composition according to either of embodiments 35 and 36, wherein the composition comprises the at least one neutralizing agent, especially dimethylethanolamine, in a total amount of 0.25 to 5 wt %, preferably of 0.3 to 4 wt %, more preferably of 0.5 to 3 wt %, more particularly of 1 to 3 wt %, based in each case on the total weight of the coating composition.

According to a thirty-eighth embodiment, the present invention relates to an aqueous coating composition according to any of the preceding embodiments, which additionally comprises at least one thickener.

According to a thirty-ninth embodiment, the present invention relates to an aqueous coating composition according to embodiment 38, wherein the thickener is selected from the group of phyllosilicates, (meth)acrylic acid-(meth)acrylate copolymers, hydrophobically modified ethoxylated polyurethanes, hydrophobically modified polyethers, hydroxyalkylcelluloses, polyamides, and mixtures thereof, especially (meth)acrylic acid-(meth)acrylate copolymers and/or hydrophobically modified ethoxylated polyurethanes.

According to a fortieth embodiment, the present invention relates to an aqueous coating composition according to either of embodiments 38 and 39, wherein the composition comprises that at least one thickener, more particularly (meth)acrylic acid-(meth)acrylate copolymers and/or hydrophobically modified ethoxylated polyurethanes, in a total amount of 0.015 to 3 wt %, preferably of 0.03 to 2 wt %, more preferably of 0.04 to 1 wt %, more particularly of 0.05 to 0.7 wt %, based in each case on the total weight of the coating composition.

According to a forty-first embodiment, the present invention relates to an aqueous coating composition according to any of embodiments 1 to 37, which comprises 0 wt %, based on the total weight of the coating composition, of phyllosilicates, more particularly sodium magnesium silicates and/or lithium aluminum magnesium silicates, and/or polyamides.

According to a forty-second embodiment, the present invention relates to an aqueous coating composition according to any of the preceding embodiments, which additionally comprises at least one crosslinking agent.

According to a forty-third embodiment, the present invention relates to an aqueous coating composition according to embodiment 42, wherein the crosslinking agent is selected from the group of melamine-formaldehyde resins, polyisocyanates, blocked polyisocyanates, polycarbodiimides, and mixtures thereof, more particularly melamine-formaldehyde resins.

According to a forty-fourth embodiment, the present invention relates to an aqueous coating composition according to either of embodiments 42 and 43, wherein the composition comprises the at least one crosslinking agent, especially melamine-formaldehyde resin, in a total amount of 1 to 10 wt %, preferably of 2 to 6 wt %, more preferably of 3 to 5 wt %, more particularly of 4 to 6 wt %, based in each case on the total weight of the coating composition.

According to a forty-fifth embodiment, the present invention relates to an aqueous coating composition according to any of the preceding embodiments, which additionally comprises at least one filler and/or at least one inorganic or organic color pigment.

According to a forty-sixth embodiment, the present invention relates to an aqueous coating composition according to embodiment 45, wherein the filler and/or the pigment is selected from the group of titanium dioxide, barium sulfate, fumed silicas, talc, carbon black, iron manganese black, spinel black, ultramarine green, manganese blue, ultramarine violet, manganese violet, red iron oxide, molybdate red, ultramarine red, brown iron oxide, mixed brown, monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black and also mixtures thereof, especially barium sulfate and/or talc.

According to a forty-seventh embodiment, the present invention relates to an aqueous coating composition according to either of embodiments 45 and 46, wherein the composition comprises the at least one filler and/or the at least one pigment, especially barium sulfate and/or talc, in a total amount of 0.1 to 6 wt %, preferably of 0.5 to 5 wt %, more preferably of 0.8 to 4 wt %, more particularly of 1 to 3 wt %, based in each case on the total weight of the coating composition.

According to a forty-eighth embodiment, the present invention relates to an aqueous coating composition according to any of the preceding embodiments, wherein the composition has a solids content of 10 to 50 wt %, preferably of 15 to 35 wt %, more particularly of 20 to 30 wt %, based in each case on the total weight of the coating composition and measured according to DIN EN ISO 3251 (June 2008).

According to a forty-ninth embodiment, the present invention relates to an aqueous coating composition according to any of the preceding embodiments, which has a pH of 7 to 10, more particularly of 7 to 9, measured in each case at 23° C.

According to a fiftieth embodiment, the present invention relates to a method for producing an aqueous coating composition, comprising
(1) providing a solution (LG) comprising at least one polycarboxylic acid PC, at least one solvent L, and optionally at least one neutralizing agent (2) adding the solution (LG) provided in step (1) to an aqueous composition comprising at least one anionically stabilized binder BM and at least one effect pigment EP.

According to a fifty-first embodiment, the present invention relates to a method for producing a multicoat paint system (M) on a substrate (S), comprising
(1) optionally producing a cured first coat (S1) on the substrate (S) by application of a composition (Z1) to the substrate (S) and subsequent curing of the composition (Z1),
(2) producing a basecoat (BL2a) or two or more directly consecutive basecoats (BL2-x) directly on the first coat (S1) by application of an aqueous basecoat material (bL2a) directly to the first coat (S1) or directly consecutive application of two or more aqueous basecoat materials (bL2-x) directly to the first coat (S1),
(3) producing a clearcoat (K) directly on the basecoat (BL2a) or on the topmost basecoat (BL2-z) by application of a clearcoat material (kL) directly to the basecoat (BL2a) or to the topmost basecoat (BL2-z),
(4) jointly curing the basecoat (BL2a) and the clearcoat (K) or the basecoats (BL2-x) and the clearcoat (K), wherein
the at least one basecoat material (bL2a) or at least one of the basecoat materials (bL2-x) comprises a composition according to any of embodiments 1 to 49, and/or the at least one basecoat material (bL2a) or at least one of the basecoat materials (bL2-x), comprising at least one anionically stabilized binder BM and at least one effect pigment EP, is mixed directly before application with at least one polycarboxylic acid PC and at least one solvent.

According to a fifty-second embodiment, the present invention relates to a method according to embodiment 51, wherein the substrate (S) is selected from metallic substrates, plastics, and mixtures thereof, more particularly from metallic substrates.

According to a fifty-third embodiment, the present invention relates to a method according to either of embodiments 51 and 52, wherein the joint curing (4) is carried at temperatures of 100 to 250° C. for a duration of 5 to 60 minutes.

According to a fifty-fourth embodiment, the present invention relates to a multicoat paint system obtainable by a method according to any of embodiments 51 to 53.

According to a fifty-fifth embodiment, the present invention relates to a multicoat paint system according to embodiment 54, wherein the surface of the multicoat paint system has a flop index of 11 to 30, preferably of 12 to 30, more particularly of 12.5 to 30.

According to a fifty-sixth embodiment, the present invention relates to the use of at least one polycarboxylic acid PC in an aqueous coating composition comprising at least one anionically stabilized binder BM and at least one effect pigment EP for improving the effect pigment orientation, the improvement being achieved relative to aqueous coating compositions free from polycarboxylic acid.

According to a fifty-seventh embodiment, the present invention relates to the use according to embodiment 56, wherein at least one polycarboxylic acid PC and at least one solvent L are used.

According to a fifty-eighth embodiment, the present invention relates to the use of at least one polycarboxylic acid PC in an aqueous coating composition comprising at least one binder BM and at least one effect pigment EP for color matching.

According to a fifty-ninth embodiment, the present invention relates to the use according to embodiment 58, wherein at least one polycarboxylic acid PC and at least one solvent L are used.

Examples

Description of Methods

1. Solids Content (Solids, Nonvolatile Fraction)

The nonvolatile fraction is determined according to DIN EN ISO 3251 (date: June 2008). It involves weighing out 1 g of sample into an aluminum dish which has been dried beforehand, drying it in a drying oven at 125° C. for 60 minutes, cooling it in a desiccator and then reweighing it. The residue relative to the total amount of sample used corresponds to the nonvolatile fraction. The volume of the nonvolatile fraction may optionally be determined if necessary according to DIN 53219 (date: August 2009).

2. Glass Transition Temperature $T_g$

The glass transition temperature $T_g$ for the purposes of the invention is determined experimentally on the basis of DIN 51005 "Thermal Analysis (TA)—Terms" and DIN 53765 "Thermal Analysis Dynamic Scanning calorimetry (DSC)". This involves weighing out a 15 mg sample into a sample boat and introducing it into a DSC instrument. After cooling to the start temperature, 1st and 2nd measurement runs are carried out with inert gas flushing (N2) of 50 ml/min with a heating rate of 10 K/min, with cooling to the start temperature again between the measurement runs. Measurement takes place customarily in the temperature range from about 50° C. lower than the expected glass transition temperature to about 50° C. higher than the glass transition temperature. The glass transition temperature for the purposes of the present invention, in accordance with DIN 53765, section 8.1, is that temperature in the 2nd measurement run at which half of the change in the specific heat capacity (0.5 delta $c_p$) is reached. This temperature is determined from the DSC diagram (plot of the heat flow against the temperature). It is the temperature at the point of intersection of the midline between the extrapolated baselines, before and after the glass transition, with the measurement plot.

3. Particle Size

The average particle size is determined by dynamic light scattering (photon correlation spectroscopy (PCS)) in accordance with DIN ISO 13321 (Date: October 2004). By average particle size here is meant the measured mean particle diameter (Z-average mean). The measurement uses a Malvern Nano S90 (from Malvern Instruments) at 25±1° C. The instrument covers a size range from 3 to 3000 nm and is equipped with a 4 mW He—Ne laser at 633 nm. The respective samples are diluted with particle-free deionized water as dispersing medium and then subjected to measurement in a 1 ml polystyrene cell at suitable scattering intensity. Evaluation took place using a digital correlator, with the assistance of the Zetasizer analysis software, version 7.11 (from Malvern Instruments). Measurement takes place five times, and the measurements are repeated on a second, freshly prepared sample. For the aqueous dispersion of the anionically stabilized polymer (asP) the average particle size refers to the arithmetical numerical mean of the measured average particle diameter (Z-average mean; numerical average). For the aqueous dispersion of the anionically stabilized polyurethane-polyurea particles (PPP), the average particle size refers to the arithmetic mean of the average particle size (volume average). The standard deviation of a 5-fold determination here is ≤4%.

4. Determination of Acid Number

The acid number is determined according to DIN EN ISO 2114 (date: June 2002), using "method A". The acid number corresponds to the mass of potassium hydroxide in mg which is needed to neutralize 1 g of sample under the conditions stipulated in DIN EN ISO 2114. The reported acid number corresponds here to the total acid number indicated in the DIN standard, and is based on the solids content.

5. Determination of OH Number

The OH number is determined according to DIN 53240-2 (date: November 2007). In this method, the OH groups are reacted by acetylation with an excess of acetic anhydride. The excess acetic anhydride is subsequently cleaved to form acetic acid by addition of water, and the total acetic acid is back-titrated with ethanolic KOH. The OH number indicates the amount of KOH in mg (based on the solid) which is equivalent to the amount of acetic acid bound in the acetylation of 1 g of sample.

6. Determination of Number-Average and Weight-Average Molecular Weight

The number-average molecular weight (Ms) is determined by gel permeation chromatography (GPC) according to DIN 55672-1 (date: August 2007). Besides the number-average molecular weight, this method can also be used, moreover, for determining the weight-average molecular weight ($M_w$) and also the polydispersity d (ratio of weight-average molecular weight ($M_w$) to number-average molecular weight ($M_n$)). Tetrahydrofuran is used as eluent. The determination is made against polystyrene standards. The column material consists of styrene-divinylbenzene copolymers.

7. Determination of Gel Fraction of the Polyurethane-Polyurea Particles (PPP)

The gel fraction of the polyurethane-polyurea particles (PPP) is determined gravimetrically in the context of the present invention. Here, first of all, the polymer present was isolated from a sample of an aqueous dispersion (initial mass 1.0 g) by freeze-drying. Following determination of the solidification temperature—the temperature above which the electrical resistance of the sample shows no further change when the temperature is lowered further—the fully frozen sample underwent its main drying, customarily in the drying vacuum pressure range between 5 mbar and 0.05 mbar, at a drying temperature lower by 10° C. than the solidification temperature. By graduated increase in the temperature of the heated surfaces beneath the polymers to 25° C., rapid freeze-drying of the polymers was achieved; after a drying time of typically 12 hours, the amount of isolated polymer (solid fraction, determined via freeze-drying) was constant and no longer underwent any change even on prolonged freeze-drying. Subsequent drying at a temperature of 30° C. of the surface beneath the polymer, with the ambient pressure reduced to the maximum degree (typically between 0.05 and 0.03 mbar), produced optimum drying of the polymer.

The isolated polymer was subsequently sintered in a forced air oven at 130° C. for 1 minute and thereafter extracted for 24 hours at 25° C. in an excess of tetrahydrofuran (ratio of tetrahydrofuran to solid fraction=300:1). The insoluble fraction of the isolated polymer (gel fraction) was then separated off on a suitable frit, dried in a forced air oven at 50° C. for 4 hours, and subsequently reweighed.

It was further ascertained that at the sintering temperature of 130° C., with variation in the sintering times between one minute and twenty minutes, the gel fraction found for the particles is independent of the sintering time. It can therefore be ruled out that crosslinking reactions subsequent to the isolation of the polymeric solid increase the gel fraction further.

The gel fraction determined in this way in accordance with the invention is also called gel fraction (freeze-dried).

In parallel a gel fraction, also referred to below as gel fraction (130° C.), was determined gravimetrically by isolating a polymer sample from aqueous dispersion (initial mass 1.0 g) at 130° C. for 60 minutes (solids content). The mass of the polymer was determined, after which the polymer, in analogy to the procedure described above, was extracted in an excess of tetrahydrofuran at 25° C. for 24 hours, the insoluble fraction (gel fraction) was separated off and dried and reweighed.

8. Solubility in Water

The solubility of an organic solvent in water at 20° C. was determined as follows. The organic solvent in question and water were combined in a suitable glass vessel and mixed, and the mixture was subsequently equilibrated. The quantities selected here for water and for the solvent were such that the equilibration produced two phases separate from one another. After the equilibration, a syringe is used to take a sample of the aqueous phase (that is, the phase which contains more water than organic solvent), and this sample is diluted in a ratio of 1/10 with tetrahydrofuran and subjected to gas chromatography to ascertain the fraction of the solvent (for conditions see Section 8. Solvent content).

If two phases do not form, irrespective of the amounts of water and the solvent, the solvent is miscible with water in any weight ratio. This therefore infinitely water-soluble solvent (acetone, for example) is therefore at any rate not a solvent (Z.2).

9. Determination of the Surface Charges by Means of Electrophoresis

The surface charges were determined by measurements with the Zetasizer Nano from Malvern in the pH range from 3 to 10. The measurements were started at the pH of the samples after dilution. The pH was adjusted using HCl and/or NaOH. The samples were measured in 10 mmol/l KCl.

10. Isocyanate Content

The isocyanate content, also referred to below as NCO content, was determined by adding an excess of a 2% solution of N,N-dibutylamine in xylene to a homogeneous solution of the samples in acetone/N-ethylpyrrolidone (1:1 vol %), using potentiometric back-titration of the excess amine with 0.1 N hydrochloric acid, in a method based on DIN EN ISO 3251, DIN EN ISO 1 1909 and DIN EN ISO 14896. Via the fraction of a polymer (solids content) in solution, it is possible to calculate back to the NCO content of the polymer, based on solids content.

11. Degree of Neutralization

The degree of neutralization of a component x was calculated from the amount-of-substance of the carboxylic acid groups present in the component (determined via the acid number) and from the amount-of-substance of the neutralizing agent used.

12. Amine Equivalent Mass

The amine equivalent mass (solution) serves for determining the amine content of a solution, and was determined as follows. The sample under investigation was dissolved in glacial acetic acid at room temperature and titrated against 0.1 N perchloric acid in glacial acetic acid, in the presence of crystal violet. From the initial mass of the sample and from the consumption of perchloric acid, the amine equivalent mass (solution) is obtained: the mass of the solution of the basic amine that is needed to neutralize one mol of perchloric acid.

13. Degree of Blocking of Primary Amino Groups

The degree of blocking of the primary amino groups was determined by means of IR spectrometry using a Nexus FT-IR spectrometer (from Nicolet) with the aid of an IR cell (d=25 mm, KBr window) at the absorption maximum at 3310 cm$^{-1}$, on the basis of concentration series of the amines used and standardization to the absorption maximum at 1166 cm$^{-1}$ (internal standard) at 25° C.

14. Production of Multicoat Paint Systems

A steel panel coated with a standard cathodic electrocoat material (CathoGuard® 500 gray from BASF Coatings) is coated, using an ESTA bell (ECO Bell 1 from ABB), with a standard commercial surfacer (UniBlock FC737555, available from BASF Coatings GmbH) in two spray passes and, after a flashing time of 10 minutes at 23° C., is subsequently cured at 150° C. for 20 minutes; the resulting dry film thickness is to be 35 μm.

Subsequently, using an ESTA bell (ECO Bell 6-F), the respective aqueous basecoat material is applied in two spray passes, with flashing for 45 seconds between each of the spray passes. The panels were then flashed at 23° C. for 10 minutes and subsequently dried at 80° C. for 10 minutes. The resulting overall dry film thickness of the respective coating composition is to be 14 μm.

After the basecoat material has dried, a bell (Eco Bell 1) is used to apply a commercial clearcoat material (DuraGloss FF700025, available from BASF Coatings GmbH), which, after a flashing time of 10 minutes at 23° C., is subsequently cured at 150° C. for 20 minutes; the resulting dry film thickness is to be 40 μm.

15. Determination of Dry Film Thicknesses

The film thicknesses are determined according to DIN EN ISO 2808 (date: May 2007), method 12A, using the MiniTest® 3100-4100 instrument from ElektroPhysik.

16. Determination of Angle-Dependent Lightnesses/Flop Index

For determining the lightness or the flop index, a substrate coated accordingly (multicoat system as in Section 15.) is subjected to measurement using a spectrophotometer (e.g. X-Rite MA60B+BA Multi-Angle Spectrophotometer). The surface is illuminated with a light source. At various angles, spectral detection is carried out in the visible range. The spectral measurements obtained in this way can be used, taking account of the standardized spectral values and also the reflection spectrum of the light source used, to calculate color values in the CIEL*a*b* color space, where L* characterizes the lightness, a* the red-green value, and b* the yellow-blue value.

This method is described for example in ASTM E2194-12 especially for coatings whose pigment comprises at least one effect pigment. The derived value, often employed for quantifying the so-called metallic effect, is the so-called flop index, which describes the relationship between the lightness and the observation angle. From the lightness values determined for the viewing angles of 15°, 45°, and 110°, it is possible to calculate a flop index ($Fl_{xRite}$) according to the formula $$Fl_{XRite} = 2.69 \frac{(L_{15}^* - L_{110}^*)^{1.11}}{L_{45}^{*0.96}}$$

where L* stands for the lightness value measured at the respective measuring angle (15°, 45°, and 110°).

Working Examples

The following inventive and comparative examples serve to elucidate the invention, but should not be interpreted as imposing any limitation.

The following should be taken into account regarding the formulation constituents and amounts thereof indicated. When reference is made to a commercial product or to a preparation protocol described elsewhere, the reference, independently of the principal designation selected for the constituent in question, is to precisely this commercial product or precisely the product prepared with the referenced protocol.

Accordingly, where a formulation constituent possesses the principal designation "melamine-formaldehyde resin" and where a commercial product is indicated for this constituent, the melamine-formaldehyde resin is used in the form of precisely this commercial product. Any further constituents present in the commercial product, such as solvents, must therefore be taken into account if conclusions are to be drawn about the amount of the active substance (of the melamine-formaldehyde resin).

If, therefore, reference is made to a preparation protocol for a formulation constituent, and if such preparation results, for example, in a polymer dispersion having a defined nonvolatile fraction, then precisely this dispersion is used. The overriding factor is not whether the principal designation that has been selected is the term "polymer dispersion" or merely the active substance, for example, "polymer", "polyester", or "polyurethane-modified polyacrylate". This must be taken into account if conclusions are to be drawn concerning the amount of the active substance (of the polymer).

1. Production of the Anionically Stabilized Binders BM 1.1 Dispersion (D1) of an Anionically Stabilized Polymer (asP)

The anionically stabilized polymer (asP) in dispersion in water was prepared as per preparation example "BM2" on pages 63 to 66 of WO 2017/088988 A1. The dispersion D1 at a pH of 8 has an electrophoretic mobility of −2.7 (μm/s)/(V/cm).

1.2 Dispersion (D2) of Anionically Stabilized Polyurethane-Polyurea Particles (PPP)

The anionically stabilized polyurethane-polyurea particles (PPP) in dispersion in water were prepared as per preparation example "PD1" on pages 75 and 76 of WO 2018/011311 A1. The dispersion D2 at a pH of 8 has an electrophoretic mobility of −6.7 (μm/s)/(V/cm).

2. Preparation of Filler Pastes 2.1 Preparation of a Barium Sulfate Paste F1

The barium sulfate paste F1 is prepared from 54.00 parts by weight of barium sulfate (Blanc Fixe Micro, available from Sachtleben Chemie), 0.3 part by weight of defoamer (Agitan 282, available from Münzing Chemie), 4.6 parts by weight of 2-butoxyethanol, 5.7 parts by weight of deionized water, 3 parts by weight of a polyester (prepared as per example D, column 16, lines 37-59 of DE A 4009858), and 32.4 parts by weight of a polyurethane, by expert grinding and subsequent homogenization.

2.2 Preparation of a Talc Paste F2

The talc paste F2 is prepared from 28 parts by weight of talc (Micro Talc IT Extra, available from Mondo Minerals), 0.4 part by weight of defoamer (Agitan 282, available from Münzing Chemie), 1.4 parts by weight of Disperbyk® 184

(available from BYK Chemie, Wesel), 0.6 part by weight of the acrylate thickener Rheovis AS 130 (available from BASF SE), 1 part by weight of 2-butoxyethanol, 3 parts by weight of Pluriol P 900 (available from BASF SE), 18.4 parts by weight of deionized water, 47 parts by weight of an acrylate polymer (binder dispersion A from application WO 91/15528 A1), and 0.2 part by weight of an aqueous dimethylethanolamine solution (10 wt % in water), by expert grinding and subsequent homogenization.

3. Production of Aqueous Coating Compositions

Unless indicated otherwise, amounts in parts by parts by weight and amounts in percent are in each case percentages by weight.

3.1 Production of Waterborne Basecoat Materials BL1 to BL12

To produce the mixing varnish ML, the melamine slurry and the aluminum pigment slurry, the respective components in the table below are homogenized at room temperature. The polycarboxylic acid preparation is produced by homogenizing the polycarboxylic acid PC in the solvent L and adding the neutralizing agent at room temperature. The polyamide wax dispersion is produced by homogenizing the polyamide at room temperature, with stirring, in the corresponding amount of deionized water.

The waterborne basecoat materials are produced as follows:

(a) the mixing varnish ML is homogenized with the melamine slurry at room temperature,
(b) the ingredients listed under the item "Basecoat Components" in the table are homogenized in succession, in the order stated there, with the mixture obtained according to (a),
(c) the aluminum pigment slurry is incorporated homogeneously into the mixture obtained according to (b), with stirring, at room temperature,
(d) the ingredients listed under the item "Additive Components" in the table are homogeneously incorporated in succession, in the order stated there, into the mixture obtained according to (c),
(e) optionally, the polycarboxylic acid preparation is incorporated homogeneously into the mixture obtained according to (d), and
(f) optionally, the polyamide wax dispersion is incorporated homogeneously into the mixture obtained according to (d).

The composition is subsequently adjusted using deionized water and dimethylethanolamine to a pH of 8.0 and to a spray viscosity of 100±5 mPa*s under a shearing load of 1000 s$^{-1}$ as measured using a rotary viscometer (Rheolab QC instrument with C-LTD80/QC conditioning system, from Anton Paar) at 23° C.

| | BL1 | BL2 | BL3 * | BL4 * | BL5 * | BL6 * | BL7 * | BL8 * | BL9 * | BL10 * | BL11 * | BL12 * |
|---|---|---|---|---|---|---|---|---|---|---|---|---|
| Mixing Varnish ML | | | | | | | | | | | | |
| 3% Na—Mg phyllosilicate solution | 15 | 15 | 15 | 15 | 15 | 15 | 15 | 15 | 15 | 15 | 15 | 15 |
| 2,4,7,9-tetramethyl-5-decynediol [1] | 0.1 | 0.1 | 0.1 | 0.1 | 0.1 | 0.1 | 0.1 | 0.1 | 0.1 | 0.1 | 0.1 | 0.1 |
| Dispersion D1 [2] | 9.1 | 9.1 | 9.1 | 9.1 | 9.1 | 9.1 | 9.1 | 9.1 | 9.1 | 9.1 | 9.1 | 9.1 |
| Melamine Slurry | | | | | | | | | | | | |
| Cymel ® 303 LF [3] | 4.9 | 4.9 | 4.9 | 4.9 | 4.9 | 4.9 | 4.9 | 4.9 | 4.9 | 4.9 | 4.9 | 4.9 |
| Isotridecyl alcohol | 3.5 | 3.5 | 3.5 | 3.5 | 3.5 | 3.5 | 3.5 | 3.5 | 3.5 | 3.5 | 3.5 | 3.5 |
| Polyester [4] | 1.55 | 1.55 | 1.55 | 1.55 | 1.55 | 1.55 | 1.55 | 1.55 | 1.55 | 1.55 | 1.55 | 1.55 |
| Basecoat Components | | | | | | | | | | | | |
| Dispersion D2 [5] | 18.8 | 18.8 | 18.8 | 18.8 | 18.8 | 18.8 | 18.8 | 18.8 | 18.8 | 18.8 | 18.8 | 18.8 |
| Deionized water | 0.3 | 0.3 | 0.3 | 0.3 | 0.3 | 0.3 | 0.3 | 0.3 | 0.3 | 0.3 | 0.3 | 0.3 |
| Rheovis ® AS 1130 (3 wt % in water) [6] | 0.1 | 0.1 | 0.1 | 0.1 | 0.1 | 0.1 | 0.1 | 0.1 | 0.1 | 0.1 | 0.1 | 0.1 |
| Rheovis ® PU1250 (50 wt % in butyl glycol) [7] | 0.1 | 0.1 | 0.1 | 0.1 | 0.1 | 0.1 | 0.1 | 0.1 | 0.1 | 0.1 | 0.1 | 0.1 |
| Aluminum Pigment Slurry | | | | | | | | | | | | |
| Butyl glycol | 3.2 | 3.2 | 3.2 | 3.2 | 3.2 | 3.2 | 3.2 | 3.2 | 3.2 | 3.2 | 3.2 | 3.2 |
| Butyl diglycol | 2.8 | 2.8 | 2.8 | 2.8 | 2.8 | 2.8 | 2.8 | 2.8 | 2.8 | 2.8 | 2.8 | 2.8 |
| Alu-Stapa Hydrolux 2156 [8] | 1.66 | 1.66 | 1.66 | 1.66 | 1.66 | 1.66 | 1.66 | 1.66 | 1.66 | 1.66 | 1.66 | 1.66 |
| Alu-Stapa Hydrolux 2192 [9] | 4.98 | 4.98 | 4.98 | 4.98 | 4.98 | 4.98 | 4.98 | 4.98 | 4.98 | 4.98 | 4.98 | 4.98 |
| Polyester [10] | 3.34 | 3.34 | 3.34 | 3.34 | 3.34 | 3.34 | 3.34 | 3.34 | 3.34 | 3.34 | 3.34 | 3.34 |
| Dimethylethanolamine (10 wt % in water) | 0.32 | 0.32 | 0.32 | 0.32 | 0.32 | 0.32 | 0.32 | 0.32 | 0.32 | 0.32 | 0.32 | 0.32 |
| Additive Components | | | | | | | | | | | | |
| Talc paste F2 | 1.3 | 1.3 | 1.3 | 1.3 | 1.3 | 1.3 | 1.3 | 1.3 | 1.3 | 1.3 | 1.3 | 1.3 |
| Barium sulfate paste F1 | 2.5 | 2.5 | 2.5 | 2.5 | 2.5 | 2.5 | 2.5 | 2.5 | 2.5 | 2.5 | 2.5 | 2.5 |
| 2-ethylhexanol | 2.0 | 2.0 | 2.0 | 2.0 | 2.0 | 2.0 | 2.0 | 2.0 | 2.0 | 2.0 | 2.0 | 2.0 |
| K-Flex ud-350w, 88% W [11] | 2.7 | 2.7 | 2.7 | 2.7 | 2.7 | 2.7 | 2.7 | 2.7 | 2.7 | 2.7 | 2.7 | 2.7 |
| Tego Wet 510, 100% [12] | 0.45 | 0.45 | 0.45 | 0.45 | 0.45 | 0.45 | 0.45 | 0.45 | 0.45 | 0.45 | 0.45 | 0.45 |
| BYK - 346 [13] | 0.07 | 0.07 | 0.07 | 0.07 | 0.07 | 0.07 | 0.07 | 0.07 | 0.07 | 0.07 | 0.07 | 0.07 |
| BYK - 381 [13] | 0.07 | 0.07 | 0.07 | 0.07 | 0.07 | 0.07 | 0.07 | 0.07 | 0.07 | 0.07 | 0.07 | 0.07 |
| Nacure 2500 [11] | 0.2 | 0.2 | 0.2 | 0.2 | 0.2 | 0.2 | 0.2 | 0.2 | 0.2 | 0.2 | 0.2 | 0.2 |

-continued

| | BL1 | BL2 | BL3 * | BL4 * | BL5 * | BL6 * | BL7 * | BL8 * | BL9 * | BL10 * | BL11 * | BL12 * |
|---|---|---|---|---|---|---|---|---|---|---|---|---|
| Polycarboxylic Acid Preparation | | | | | | | | | | | | |
| Polycarboxylic acid PC [14] | — | — | 0.05 | 0.10 | 0.15 | 0.20 | 0.25 | 0.30 | 0.35 | 0.40 | 0.45 | 0.50 |
| Solvent L [15] | — | — | 0.3 | 0.60 | 0.9 | 1.2 | 1.5 | 1.8 | 2.1 | 2.4 | 2.7 | 3.0 |
| Neutralizing agent [16] | — | — | 0.05 | 0.10 | 0.15 | 0.20 | 0.25 | 0.30 | 0.35 | 0.40 | 0.45 | 0.50 |
| Polyamide Wax Dispersion | | | | | | | | | | | | |
| Disparlon AQ-633E [17] | — | 5 | — | — | — | — | — | — | — | — | — | — |
| Deionized water | — | 12.5 | — | — | — | — | — | — | — | — | — | — |

* inventive uses
[1] 52% in BG (BASF SE)
[2] Anionically stabilized binder (aqueous dispersion of anionically stabilized polymer (asP))
[3] Melamine-formaldehyde resin (Allnex)
[4] Prepared as per example BE1, p. 28, ll. 13-33 of WO2014/033135
[5] Anionically stabilized binder (aqueous dispersion of the anionically stabilized polyurethane-polyurea particles (PPP))
[6] BASF SE
[7] BASF SE
[8] Effect pigment EP (65% W/W, Altana-Eckart)
[9] Effect pigment EP (65% W/W, Altana-Eckart)
[10] Prepared as per example D, column 16, ll. 37-59 of DE-A-4009858
[11] King Industries
[12] Evonik
[13] Altana-Byk
[14] Dicarboxylic acid of the formula (I) wherein x is preferably 7 and $K^+$ is hydrogen or cationized neutralizing agent
[15] Preferably 1-methoxy-2-propanol
[16] Preferably dimethylethanolamine
[17] Kusumoto Chemicals Ltd.

3.2 Production of Waterborne Basecoat Materials BL13 to BL16

The waterborne basecoat materials BL13 to BL16 are produced as described in section 3.1. However, the components used were those from the following table (superscript numbers have the same definition as in the table in section 3.1).

| | BL13 | BL14 | BL15 * | BL16 |
|---|---|---|---|---|
| Mixing Varnish ML | | | | |
| 3% Na—Mg phyllosilicate solution | 15 | 15 | 15 | 15 |
| 2,4,7,9-tetramethyl-5-decynediol [1] | 0.1 | 0.1 | 0.1 | 0.1 |
| Dispersion D1 [2] | 9.1 | 9.1 | 9.1 | 9.1 |
| Melamine Slurry | | | | |
| Cymel ® 303 LF [3] | 4.9 | 4.9 | 4.9 | 4.9 |
| Isotridecyl alcohol | 3.5 | 3.5 | 3.5 | 3.5 |
| Polyester [4] | 1.55 | 1.55 | 1.55 | 1.55 |
| Basecoat Components | | | | |
| Dispersion D2 [5] | 18.8 | 18.8 | 18.8 | 18.8 |
| Deionized water | 0.3 | 0.3 | 0.3 | 0.3 |
| Rheovis ® AS 1130 (3 wt % in water) [6] | 0.1 | 0.1 | 0.1 | 0.1 |
| Rheovis ® PU1250 (50 wt % in butyl glycol) [7] | 0.1 | 0.1 | 0.1 | 0.1 |
| Aluminum Pigment Slurry | | | | |
| Butyl glycol | 3.2 | 3.2 | 3.2 | 3.2 |
| Butyl diglycol | 2.8 | 2.8 | 2.8 | 2.8 |
| Alu-Stapa Hydrolux 2156 [8] | 1.66 | 1.66 | 1.66 | 1.66 |
| Alu-Stapa Hydrolux 2192 [9] | 4.98 | 4.98 | 4.98 | 4.98 |
| Polyester [10] | 3.34 | 3.34 | 3.34 | 3.34 |
| Dimethylethanolamine (10 wt % in water) | 0.32 | 0.32 | 0.32 | 0.32 |
| Additive Components | | | | |
| Talc paste F2 | 1.3 | 1.3 | 1.3 | 1.3 |
| Barium sulfate paste F1 | 2.5 | 2.5 | 2.5 | 2.5 |
| 2-ethylhexanol | 2.0 | 2.0 | 2.0 | 2.0 |
| K-Flex ud-350w, 88% W [11] | 2.7 | 2.7 | 2.7 | 2.7 |
| Tego Wet 510, 100% [12] | 0.45 | 0.45 | 0.45 | 0.45 |
| BYK - 346 [13] | 0.07 | 0.07 | 0.07 | 0.07 |
| BYK - 381 [13] | 0.07 | 0.07 | 0.07 | 0.07 |
| Nacure 2500 [11] | 0.2 | 0.2 | 0.2 | 0.2 |
| Polycarboxylic Acid Preparation | | | | |
| Polycarboxylic acid PC [14] | — | — | 0.25 | — |
| Solvent L [15] | — | — | 1.5 | 1.5 |
| Neutralizing agent [16] | — | — | 0.25 | — |
| Polyamide Wax Dispersion | | | | |
| Disparlon AQ-633E [17] | — | 5 | — | — |
| Deionized water | — | 12.5 | — | — |

* inventive uses 3.3 Production of Waterborne Basecoat Materials BL17 to BL20

The waterborne basecoat materials BL17 to BL20 are produced as described in section 3.1. However, the components used were those from the following table (superscript numbers have the same definition as in the table in section 3.1).

| | BL17 | BL18 | BL19 * | BL20 |
|---|---|---|---|---|
| Mixing Varnish ML | | | | |
| 3% Na—Mg phyllosilicate solution | | | | |
| 2,4,7,9-tetramethyl-5-decynediol [1] | 0.1 | 0.1 | 0.1 | 0.1 |
| Dispersion D1 [2] | 9.1 | 9.1 | 9.1 | 9.1 |

-continued

|  | BL17 | BL18 | BL19 * | BL20 |
|---|---|---|---|---|
| Melamine Slurry | | | | |
| Cymel ® 303 LF [3] | 4.9 | 4.9 | 4.9 | 4.9 |
| Isotridecyl alcohol | 3.5 | 3.5 | 3.5 | 3.5 |
| Polyester [4] | 1.55 | 1.55 | 1.55 | 1.55 |
| Basecoat Components | | | | |
| Dispersion D2 [5] | 18.8 | 18.8 | 18.8 | 18.8 |
| Deionized water | 0.3 | 0.3 | 0.3 | 0.3 |
| Rheovis ® AS 1130 (3 wt % in water) [6] | 0.1 | 0.1 | 0.1 | 0.1 |
| Rheovis ® PU1250 (50 wt % in butyl glycol) [7] | 0.1 | 0.1 | 0.1 | 0.1 |
| Aluminum Pigment Slurry | | | | |
| Butyl glycol | 3.2 | 3.2 | 3.2 | 3.2 |
| Butyl diglycol | 2.8 | 2.8 | 2.8 | 2.8 |
| Alu-Stapa Hydrolux 2156 [8] | 1.66 | 1.66 | 1.66 | 1.66 |
| Alu-Stapa Hydrolux 2192 [9] | 4.98 | 4.98 | 4.98 | 4.98 |
| Polyester [10] | 3.34 | 3.34 | 3.34 | 3.34 |
| Dimethylethanolamine (10 wt % in water) | 0.32 | 0.32 | 0.32 | 0.32 |
| Additive Components | | | | |
| Talc paste F2 | 1.3 | 1.3 | 1.3 | 1.3 |
| Barium sulfate paste F1 | 2.5 | 2.5 | 2.5 | 2.5 |
| 2-ethylhexanol | 2.0 | 2.0 | 2.0 | 2.0 |
| K-Flex ud-350w, 88% W [11] | 2.7 | 2.7 | 2.7 | 2.7 |
| Tego Wet 510, 100% [12] | 0.45 | 0.45 | 0.45 | 0.45 |
| BYK - 346 [13] | 0.07 | 0.07 | 0.07 | 0.07 |
| BYK - 381 [13] | 0.07 | 0.07 | 0.07 | 0.07 |
| Nacure 2500 [11] | 0.2 | 0.2 | 0.2 | 0.2 |
| Polycarboxylic Acid Preparation | | | | |
| Polycarboxylic acid PC [14] | — | — | 0.25 | — |
| Solvent L [15] | — | — | 1.5 | 1.5 |
| Neutralizing agent [16] | — | — | 0.25 | — |
| Polyamide Wax Dispersion | | | | |
| Disparlon AQ-633E [17] | — | 5 | — | — |
| Deionized water | — | 12.5 | — | — |

* inventive uses

3.4 Production of Waterborne Basecoat Materials BL21 to BL24

The waterborne basecoat materials BL21 to BL24 are produced as described in section 3.1. However, the components used were those from the following table (superscript numbers have the same definition as in the table in section 3.1).

|  | BL21 | BL22 | BL23 | BL24 * |
|---|---|---|---|---|
| Mixing Varnish ML | | | | |
| 3% Na—Mg phyllosilicate solution | 15 | 15 | 15 | 15 |
| Deionized water | 5.0 | 5.0 | 5.0 | 5.0 |
| 2,4,7,9-tetramethyl-5-decynediol [1] | 0.1 | 0.1 | 0.1 | 0.1 |
| Dispersion D1 [2] | 36.4 | 18.2 | — | — |
| Melamine Slurry | | | | |
| Cymel ® 303 LF [3] | 4.9 | 4.9 | 4.9 | 4.9 |
| Isotridecyl alcohol | 3.5 | 3.5 | 3.5 | 3.5 |
| Polyester [4] | 1.55 | 1.55 | 1.55 | 1.55 |
| Basecoat Components | | | | |
| Dispersion D2 [5] | — | 12.54 | 25.07 | 25.07 |
| Deionized water | 0.3 | 0.3 | 0.3 | 0.3 |
| Rheovis ® AS 1130 (3 wt % in water) [6] | 0.1 | 0.1 | 0.1 | 0.1 |
| Rheovis ® PU1250 (50 wt % in butyl glycol) [7] | 0.1 | 0.1 | 0.1 | 0.1 |
| Aluminum Pigment Slurry | | | | |
| Butyl glycol | 3.2 | 3.2 | 3.2 | 3.2 |
| Butyl diglycol | 2.8 | 2.8 | 2.8 | 2.8 |
| Alu-Stapa Hydrolux 2156 [8] | 1.66 | 1.66 | 1.66 | 1.66 |
| Alu-Stapa Hydrolux 2192 [9] | 4.98 | 4.98 | 4.98 | 4.98 |
| Polyester [10] | 3.34 | 3.34 | 3.34 | 3.34 |
| Dimethylethanolamine (10 wt % in water) | 0.32 | 0.32 | 0.32 | 0.32 |
| Additive Components | | | | |
| Talc paste F2 | 1.3 | 1.3 | 1.3 | 1.3 |
| Barium sulfate paste F1 | 2.5 | 2.5 | 2.5 | 2.5 |
| 2-ethylhexanol | 2.0 | 2.0 | 2.0 | 2.0 |
| K-Flex ud-350w, 88% W [11] | 2.7 | 2.7 | 2.7 | 2.7 |
| Tego Wet 510, 100% [12] | 0.45 | 0.45 | 0.45 | 0.45 |
| BYK - 346 [13] | 0.07 | 0.07 | 0.07 | 0.07 |
| BYK - 381 [13] | 0.07 | 0.07 | 0.07 | 0.07 |
| Nacure 2500 [11] | 0.2 | 0.2 | 0.2 | 0.2 |
| Polycarboxylic Acid Preparation | | | | |
| Polycarboxylic acid PC [14] | — | — | — | 0.25 |
| Solvent L [15] | — | — | — | 1.5 |
| Neutralizing agent [16] | — | — | — | 0.25 |

* inventive uses

3.5 Production of Waterborne Basecoat Materials BL25 to BL27

The waterborne basecoat materials BL25 to BL27 are produced as described in section 3.1 (a) to (d). However, the components used were those from the following table (superscript numbers have the same definition as in the table in section 3.1). The polycarboxylic acid preparation is homogeneously incorporated subsequently for each of the fully produced basecoat materials BL26 and BL27.

|  | BL25 | BL26 * | BL27 * |
|---|---|---|---|
| Mixing Varnish ML | | | |
| 3% Na—Mg phyllosilicate solution | 15 | 15 | 15 |
| Deionized water | 5.0 | 5.0 | 5.0 |
| 4,7,9-tetramethyl-5-decynediol [1] | 0.1 | 0.1 | 0.1 |
| Dispersion D1 [2] | 9.1 | 9.1 | 9.1 |
| Melamine Slurry | | | |
| Cymel ® 303 LF [3] | 4.9 | 4.9 | 4.9 |
| Isotridecyl alcohol | 3.5 | 3.5 | 3.5 |
| Polyester [4] | 1.55 | 1.55 | 1.55 |
| Basecoat Components | | | |
| Dispersion D2 [5] | 18.8 | 18.8 | 18.8 |
| Deionized water | 0.3 | 0.3 | 0.3 |
| Rheovis ® AS 1130 (3 wt % in water) [6] | 0.1 | 0.1 | 0.1 |
| Rheovis ® PU1250 (50 wt % in butyl glycol) [7] | 0.1 | 0.1 | 0.1 |

-continued

|  | BL25 | BL26 * | BL27 * |
|---|---|---|---|
| Aluminum Pigment Slurry | | | |
| Butyl glycol | 3.2 | 3.2 | 3.2 |
| Butyl diglycol | 2.8 | 2.8 | 2.8 |
| Alu-Stapa Hydrolux 2156 [8] | 1.66 | 1.66 | 1.66 |
| Alu-Stapa Hydrolux 2192 [9] | 4.98 | 4.98 | 4.98 |
| Polyester [10] | 3.34 | 3.34 | 3.34 |
| Dimethylethanolamine (10 wt % in water) | 0.32 | 0.32 | 0.32 |
| Additive Components | | | |
| Talc paste F2 | 1.3 | 1.3 | 1.3 |
| Barium sulfate paste F1 | 2.5 | 2.5 | 2.5 |
| 2-ethylhexanol | 2.0 | 2.0 | 2.0 |
| K-Flex ud-350w, 88% W [11] | 2.7 | 2.7 | 2.7 |
| Tego Wet 510, 100% [12] | 0.45 | 0.45 | 0.45 |
| BYK - 346 [13] | 0.07 | 0.07 | 0.07 |
| BYK - 381 [13] | 0.07 | 0.07 | 0.07 |
| Nacure 2500 [11] | 0.2 | 0.2 | 0.2 |
| Polycarboxylic Acid Preparation | | | |
| Polycarboxylic acid PC [14] | — | 0.25 | 0.33 |
| Solvent L [15] | — | 1.5 | 1.98 |
| Neutralizing agent [16] | — | 0.25 | 0.33 |
| Deionized water | — | 3.00 | 5.00 |
| Dimethylethanolamine (10 wt % in water) | — | — | 0.30 |

* inventive uses 3.6 Production of Waterborne Basecoat Materials BL28 to BL33

The waterborne basecoat materials BL28 to BL33 are produced as described in section 3.1 (a) to (d). However, the components used were those from the following table (superscript numbers have the same definition as in the table in section 3.1).

|  | BL28 | BL29 * | BL30 * | BL31 * | BL32 * | BL33 * |
|---|---|---|---|---|---|---|
| Mixing Varnish ML | | | | | | |
| 3% Na—Mg phyllosilicate solution | 15 | 15 | 15 | 15 | 15 | 15 |
| Deionized water | 5.0 | 5.0 | 5.0 | 5.0 | 5.0 | 5.0 |
| 2,4,7,9-Tetramethyl-5-decynediol [1] | 0.1 | 0.1 | 0.1 | 0.1 | 0.1 | 0.1 |
| Dispersion D1 [2] | 9.1 | 9.1 | 9.1 | 9.1 | 9.1 | 9.1 |
| Melamine Slurry | | | | | | |
| Cymel ® 303 LF [3] | 4.9 | 4.9 | 4.9 | 4.9 | 4.9 | 4.9 |
| Isotridecyl alcohol | 3.5 | 3.5 | 3.5 | 3.5 | 3.5 | 3.5 |
| Polyester [4] | 1.55 | 1.55 | 1.55 | 1.55 | 1.55 | 1.55 |
| Basecoat Components | | | | | | |
| Dispersion D2 [5] | 18.8 | 18.8 | 18.8 | 18.8 | 18.8 | 18.8 |
| Deionized water | 0.3 | 0.3 | 0.3 | 0.3 | 0.3 | 0.3 |
| Rheovis ® AS 1130 (3 wt % in water) [6] | 0.1 | 0.1 | 0.1 | 0.1 | 0.1 | 0.1 |
| Rheovis ® PU1250 (50 wt % in butyl glycol) [7] | 0.1 | 0.1 | 0.1 | 0.1 | 0.1 | 0.1 |
| Aluminum Pigment Slurry | | | | | | |
| Butyl glycol | 3.2 | 3.2 | 3.2 | 3.2 | 3.2 | 3.2 |
| Butyl diglycol | 2.8 | 2.8 | 2.8 | 2.8 | 2.8 | 2.8 |
| Alu-Stapa Hydrolux 2156 [8] | 1.66 | 1.66 | 1.66 | 1.66 | 1.66 | 1.66 |
| Alu-Stapa Hydrolux 2192 [9] | 4.98 | 4.98 | 4.98 | 4.98 | 4.98 | 4.98 |
| Polyester [10] | 3.34 | 3.34 | 3.34 | 3.34 | 3.34 | 3.34 |
| Dimethylethanolamine (10 wt % in water) | 0.32 | 0.32 | 0.32 | 0.32 | 0.32 | 0.32 |
| Additive Components | | | | | | |
| Talc paste F2 | 1.3 | 1.3 | 1.3 | 1.3 | 1.3 | 1.3 |
| Barium sulfate paste F1 | 2.5 | 2.5 | 2.5 | 2.5 | 2.5 | 2.5 |
| 2-Ethylhexanol | 2.0 | 2.0 | 2.0 | 2.0 | 2.0 | 2.0 |
| K-Flex ud-350w, 88% W [11] | 2.7 | 2.7 | 2.7 | 2.7 | 2.7 | 2.7 |
| Tego Wet 510, 100% [12] | 0.45 | 0.45 | 0.45 | 0.45 | 0.45 | 0.45 |
| BYK - 346 [13] | 0.07 | 0.07 | 0.07 | 0.07 | 0.07 | 0.07 |
| BYK - 381 [13] | 0.07 | 0.07 | 0.07 | 0.07 | 0.07 | 0.07 |
| Nacure 2500 [11] | 0.2 | 0.2 | 0.2 | 0.2 | 0.2 | 0.2 |
| Polycarboxylic Acid Preparation | | | | | | |
| Polycarboxylic acid PC1 [14] | — | 0.25 | — | — | — | — |
| Polycarboxylic acid PC2 [18] | — | — | 0.213 | — | — | — |
| Polycarboxylic acid PC3 [19] | — | — | — | 0.231 | — | — |
| Polycarboxylic acid PC4 [20] | — | — | — | — | 0.269 | — |

|  | BL28 | BL29 * | BL30 * | BL31 * | BL32 * | BL33 * |
|---|---|---|---|---|---|---|
| Polycarboxylic acid PC5 [21] | — | — | — | — | — | 0.306 |
| Neutralizing agent [16] | — | 1.50 | 1.277 | 1.388 | 1.612 | 1.835 |
| Deionized water | — | 0.25 | 0.213 | 0.231 | 0.269 | 0.306 |

* inventive uses

[18] Dicarboxylic acid of formula (I), in which x is 5 and K$^+$ is hydrogen or cationized neutralizing agent,

[19] Dicarboxylic acid of formula (I), in which x is 6 and K$^+$ is hydrogen or cationized neutralizing agent,

[20] Dicarboxylic acid of formula (I), in which x is 8 and K$^+$ is hydrogen or cationized neutralizing agent,

[21] Dicarboxylic acid of formula (I), in which x is 10 and K$^+$ is hydrogen or cationized neutralizing agent

3.7 Production of Waterborne Basecoat Materials BL34 to BL37

The waterborne basecoat materials BL34 to BL37 are produced as described in section 3.1 (a) to (d). However, the components used were those from the following table (superscript numbers have the same definition as in the table in section 3.1).

|  | BL34 | BL35 * | BL36 | BL37 |
|---|---|---|---|---|
| Mixing Varnish ML |  |  |  |  |
| 3% Na—Mg phyllosilicate solution | 15 | 15 | 15 | 15 |
| Deionized water | 5.0 | 5.0 | 5.0 | 5.0 |
| 2,4,7,9-Tetramethyl-5-decynediol [1] | 0.1 | 0.1 | 0.1 | 0.1 |
| Dispersion D1 [2] | 9.1 | 9.1 | 9.1 | 9.1 |
| Melamine Slurry |  |  |  |  |
| Cymel ® 303 LF [3] | 4.9 | 4.9 | 4.9 | 4.9 |
| Isotridecyl alcohol | 3.5 | 3.5 | 3.5 | 3.5 |
| Polyester [4] | 1.55 | 1.55 | 1.55 | 1.55 |
| Basecoat Components |  |  |  |  |
| Dispersion D2 [5] | 18.8 | 18.8 | 18.8 | 18.8 |
| Deionized water | 0.3 | 0.3 | 0.3 | 0.3 |
| Rheovis ® AS 1130 (3 wt % in water) [6] | 0.1 | 0.1 | 0.1 | 0.1 |
| Rheovis ® PU1250 (50 wt % in butyl glycol) [7] | 0.1 | 0.1 | 0.1 | 0.1 |
| Aluminum Pigment Slurry |  |  |  |  |
| Butyl glycol | 3.2 | 3.2 | 3.2 | 3.2 |
| Butyl diglycol | 2.8 | 2.8 | 2.8 | 2.8 |
| Alu-Stapa Hydrolux 2156 [8] | 1.66 | 1.66 | 1.66 | 1.66 |
| Alu-Stapa Hydrolux 2192 [9] | 4.98 | 4.98 | 4.98 | 4.98 |
| Polyester [10] | 3.34 | 3.34 | 3.34 | 3.34 |
| Dimethylethanolamine (10 wt % in water) | 0.32 | 0.32 | 0.32 | 0.32 |
| Additive Components |  |  |  |  |
| Talc paste F2 | 1.3 | 1.3 | 1.3 | 1.3 |
| Barium sulfate paste F1 | 2.5 | 2.5 | 2.5 | 2.5 |
| 2-Ethylhexanol | 2.0 | 2.0 | 2.0 | 2.0 |
| K-Flex ud-350w, 88% W [11] | 2.7 | 2.7 | 2.7 | 2.7 |
| Tego Wet 510, 100% [12] | 0.45 | 0.45 | 0.45 | 0.45 |
| BYK - 346 [13] | 0.07 | 0.07 | 0.07 | 0.07 |
| BYK - 381 [13] | 0.07 | 0.07 | 0.07 | 0.07 |
| Nacure 2500 [11] | 0.2 | 0.2 | 0.2 | 0.2 |
| Polycarboxylic Acid Preparation |  |  |  |  |
| Polycarboxylic acid PC1 [14] | — | 0.25 | — | — |
| Pelargonic acid | — | — | 0.42 | — |
| Stearic acid | — | — | — | 0.756 |
| Neutralizing agent [16] | — | 1.5 | 2.522 | 9.078 |
| Deionized water | — | 0.25 | 0.237 | 0.237 |

* inventive uses

4. Determination of Flop Index

4.1 Comparison of Waterborne Basecoat Materials BL1 to BL12

The flop index of multicoat paint systems produced using the waterborne basecoat materials BL1 to BL12 was determined in accordance with the above-described method (see section 17 of the Description of methods). Table 4.1 collates the results.

TABLE 4.1

Comparison of flop index of waterborne basecoat materials (WBM) BL1 to BL12

| WBM | Nonvolatile fraction [1] | Lightness L at 15° | Flop index | LW | SW | CF |
|---|---|---|---|---|---|---|
| BL1 | 29.8 | 131 | 11.8 | 2.5 | 12.8 | 65.8 |
| BL2 | 29.7 | 136 | 13.2 | 2.7 | 12.6 | 63.7 |
| BL3 * | 28.9 | 128 | 11.1 | 2.3 | 11.4 | 65.7 |
| BL4 * | 28 | 130 | 11.9 | 2.2 | 12.1 | 66.9 |
| BL5 * | 26.5 | 131 | 11.9 | 2.7 | 11.4 | 65.2 |
| BL6 * | 26.5 | 132 | 12.0 | 2.7 | 11.9 | 64.1 |
| BL7 * | 25.3 | 134 | 12.9 | 2.4 | 11.1 | 64.2 |
| BL8 * | 24.8 | 136 | 13.2 | 2.1 | 11.1 | 64.7 |
| BL9 * | 23.8 | 137 | 13.7 | 2.1 | 11.0 | 64.6 |
| BL10 * | 23.5 | 137 | 13.5 | 2.4 | 11.0 | 62.2 |
| BL11 * | 22.7 | 141 | 14.8 | 2.3 | 11.1 | 62.3 |
| BL12 * | 21.2 | 144 | 16.0 | 2.1 | 10.6 | 62.5 |

* inventive uses

[1] in wt %

The use of a polycarboxylic acid PC in combination with anionically stabilized binders BM and also the at least one solvent L leads, even at an amount of 0.05 wt % (BL4), to a flop index which is achieved when using phyllosilicates (BL1). From an amount of 0.30 wt % of polycarboxylic acid PC (BL8), a flop index is obtained which is comparable with the use of a combination of phyllosilicates and polyamides (BL2). The flop index can be boosted further by adding larger quantities of the polycarboxylic acid PC (BL9-BL12). Independently of the concentration employed, the polycarboxylic acid preparation can be incorporated homogeneously and with no incompatibilities into all of the basecoat materials. No unwanted separation phenomena were obtained.

4.2 Comparison of Waterborne Basecoat Materials BL13 to BL16

The flop index of multicoat paint systems produced using the waterborne basecoat materials BL13 to BL16 was determined in accordance with the above-described method (see section 17 of the Description of methods). Table 4.2 collates the results.

TABLE 4.2

Comparison of flop index of waterborne basecoat materials (WBM) BL13 to BL16

| WBM | Nonvolatile fraction [1] | Lightness at L 15° | Flop index | LW | SW | CF |
|---|---|---|---|---|---|---|
| BL13 | 29.4 | 132 | 12.05 | 2.7 | 18.4 | 63.6 |
| BL14 | 29.1 | 134 | 12.63 | 2.9 | 21.1 | 62.3 |
| BL15 * | 26.6 | 134 | 12.63 | 2.0 | 16.0 | 67.6 |
| BL16 | 29.2 | 130 | 11.62 | 2.1 | 16.3 | 66.5 |

* inventive uses
[1] in wt %

The inventive waterborne basecoat material BL15 has a flop index identical with that of the waterborne basecoat material comprising polyamides (BL14). When using the at least one polycarboxylic acid PC, therefore, even in the absence of polyamides, a high flop index can be reliably achieved (regarding the reproducibility, see also values in Table 4.1). The improvement in the flop index when adding the polycarboxylic acid PC in conjunction with the at least one solvent L is all the more surprising here because the addition solely of the solvent L (BL16) leads to a poorer flop index (cf. flop index of BL13 and BL16). The inventive compositions therefore allow aqueous basecoat materials with a high flop index to be provided without addition of polyamides, which can lead to unwanted separation phenomena, poor leveling, and poor appearance.

4.3 Comparison of Waterborne Basecoat Materials BL17 to BL20

The flop index of multicoat paint systems produced using the waterborne basecoat materials BL17 to BL20 was determined in accordance with the above-described method (see section 17 of the Description of methods). Table 4.3 collates the results.

TABLE 4.3

Comparison of flop index of waterborne basecoat materials (WBM) BL17 to BL20

| WBM | Nonvolatile fraction [1] | Lightness L at 15° | Flop index | LW | SW | CF |
|---|---|---|---|---|---|---|
| BL17 | 30.4 | 125 | 10.41 | 2.2 | 16.5 | 68.2 |
| BL18 | 29.9 | 128 | 11.08 | 2.3 | 18.1 | 67.9 |
| BL19 * | 26.9 | 127 | 10.93 | 2.3 | 16.4 | 68.1 |
| BL20 | 29.6 | 123 | 9.90 | 2.2 | 16.1 | 68.2 |

* inventive uses
[1] in wt %

The inventive waterborne basecoat material BL19, which comprises no phyllosilicates and polyamides, has a flop index comparable with that of the polyamide-containing waterborne basecoat material (BL18). When using the at least one polycarboxylic acid PC, therefore, even in the absence of polyamides and phyllosilicates, a high flop index can be achieved. The improvement in the flop index when adding the polycarboxylic acid PC in conjunction with the at least one solvent L is all the more surprising here because the addition solely of the solvent L (BL20) leads to a poorer flop index (cf. flop index of BL17 and BL20). The inventive compositions therefore allow aqueous basecoat materials with a high flop index to be provided without addition of polyamides and phyllosilicates, which can lead to poor leveling, and poor appearance.

4.4 Comparison of Waterborne Basecoat Materials BL21 to BL24

The flop index of multicoat paint systems produced using the waterborne basecoat materials BL21 to BL24 was determined in accordance with the above-described method (see section 17 of the Description of methods).

Table 4.4 collates the results.

TABLE 4.4

Comparison of flop index of waterborne basecoat materials (WBM) BL21 to BL24

| WBM | Nonvolatile fraction [1] | Lightness L at 15° | Flop index | LW | SW | CF |
|---|---|---|---|---|---|---|
| BL21 | 27.7 | 117 | 8.7 | 2.7 | 15.1 | 64.4 |
| BL22 | 29.5 | 125 | 10.4 | 2.9 | 13.7 | 62.9 |
| BL23 | 32.1 | 127 | 10.8 | 2.6 | 13.3 | 64.5 |
| BL24 * | 28.3 | 130 | 11.6 | 3.1 | 15.5 | 61.7 |

* inventive uses
[1] in wt %

The noninventive basecoat material BL21, which comprises an anionically stabilized binder BM having an electrophoretic mobility at pH 8.0 of −2.5 to −4 (µm/s)/(V/cm) (dispersion D1) but no polycarboxylic acid PC, has a low flop index. The flop index can be increased by using a combination of two anionically stabilized binders (dispersions D1 and D2) (BL22) or by using an anionically stabilized binder having an electrophoretic mobility at pH 8.0 of −6 to −8 (µm/s)/(V/cm) (dispersion D2) (BL23). By adding the polycarboxylic acid PC to the basecoat material BL23, which comprises an anionically stabilized binder BM having an electrophoretic mobility at pH 8.0 of −6 to −8 (µm/s)/(V/cm) (dispersion D2) (BL24), the flop index can be increased further. Consequently, as well as the use of the at least one polycarboxylic acid PC, the use of an anionically stabilized binder with sufficiently negative surface charge is necessary in order to ensure a high flop index.

4.5 Comparison of Waterborne Basecoat Materials BL25 to BL27

The flop index of multicoat paint systems produced using the waterborne basecoat materials BL25 to BL27 was determined in accordance with the above-described method (see section 17 of the Description of methods). Table 4.5 collates the results.

TABLE 4.5

Comparison of flop index of waterborne basecoat materials (WBM) BL25 to BL27

| WBM | Nonvolatile fraction [1] | Lightness L at 15° | Flop index |
|---|---|---|---|
| BL25 | 29.1 | 125 | 10.32 |
| BL26 * | —[2] | 130 | 11.67 |
| BL27 * | 29.6 | 132 | 12.23 |

* inventive uses
[1] in wt %
[2] was not determined

The increase in the flop index as a result of adding the at least one polycarboxylic acid PC occurs not only when the polycarboxylic acid PC and the solvent L are added during the preparation of the basecoat material (see Tables 4.1 to 4.4), but also when a mixture of polycarboxylic acid PC and solvent L is added to a basecoat material which has already been fully produced (cf. BL26 and BL27). By this means it is possible to carry out a subsequent color matching by the addition of the mixture of polycarboxylic acid PC and solvent L, for example, in the circuit line on an automotive manufacturing line. This enables the continued use of basecoat compositions which on the basis of the difference in shade are outside specification and therefore have to be disposed of. The addition of the at least one polycarboxylic acid PC in combination with the at least one solvent L for the color matching of basecoat compositions which have already been fully produced therefore also increases the environmental balance and efficiency of the basecoat production process.

4.6 Comparison of Waterborne Basecoat Materials BL28 to BL33

The flop index of multicoat paint systems produced using the waterborne basecoat materials BL28 to BL33 was determined in accordance with the above-described method (see section 17 of the Description of methods).

Table 4.6 collates the results.

TABLE 4.6

Comparison of flop index of waterborne basecoat materials (WBM) BL28 to BL33

| WBM | Nonvolatile fraction [1] | Lightness L at 15° | Flop index |
| --- | --- | --- | --- |
| BL28 | 29.2 | 128 | 11.35 |
| BL29 * | 26.3 | 133 | 12.32 |
| BL30 * | 26.4 | 133 | 12.49 |
| BL31 * | 26.7 | 132 | 12.35 |
| BL32 * | 26.7 | 134 | 12.94 |
| BL33 * | 25.8 | 134 | 12.94 |

* inventive uses
[1] in wt %

The inventive waterborne basecoat materials BL29 to BL33, which contain different dicarboxylic acids, lead to a higher flop index than the noninventive waterborne basecoat material BL28, which contains no polycarboxylic acid. The increase in the flop index when adding the polycarboxylic acid PC is in this case substantially independent of the number of carbon atoms between the two acid functions.

4.7 Comparison of Waterborne Basecoat Materials BL34 to BL37

The flop index of multicoat paint systems produced using the waterborne basecoat materials BL34 to BL37 was determined in accordance with the above-described method (see section 17 of the Description of methods).

Table 4.7 collates the results.

TABLE 4.7

Comparison of flop index of waterborne basecoat materials (WBM) BL34 to BL37

| WBM | Nonvolatile fraction [1] | Lightness L at 15° | Flop index |
| --- | --- | --- | --- |
| BL34 | 31.6 | 124 | 10.28 |
| BL35 * | 28.6 | 129 | 11.34 |
| BL36 | 29.4 | 127 | 10.81 |
| BL37 | 28.6 | 126 | 10.68 |

* inventive uses
[1] in wt %

The inventive waterborne basecoat material BL35, which contains a dicarboxylic acid in the form of azelaic acid, leads to a higher flop index than the noninventive waterborne basecoat materials BL34, BL36 and BL37, which contain no polycarboxylic acid (BL34) or contain monocarboxylic acids (BL36 and BL37). An increase in the flop index is therefore achieved only on addition of dicarboxylic acids, but not of monocarboxylic acids.

What is claimed is:

1. An aqueous coating composition comprising
   (a) at least one anionically stabilized binder BM,
   (b) at least one effect pigment EP,
   (c) at least one polycarboxylic acid PC or salt thereof having the general formula (I)

$$K^+{}^-OOC-(CH_2)_X-COO^-K^+$$

in which
   x stands for integers from 1 to 30, and $K^+$ is hydrogen or a cation, and
   (d) at least one solvent L.

2. The aqueous coating composition as claimed in claim 1, wherein the at least one anionically stabilized binder BM at a pH of 8.0 has an electrophoretic mobility of −2.5 to −15 (μm/s)/(V/cm).

3. The aqueous coating composition as claimed in claim 1, wherein the at least one anionically stabilized binder BM is present in a total amount of 20 to 80 wt %-based on the overall solids content of the coating composition.

4. The aqueous coating composition as claimed in claim 1, wherein the at least one anionically stabilized binder BM comprises anionically stabilized polyurethane-polyurea particles (PPP) dispersed in water and having an average particle size of 40 to 2000 nm and a gel fraction of at least 50%, the anionically stabilized polyurethane-polyurea particles comprising, in each case in reacted form,
   (Z.1.1) at least one isocyanate group-containing polyurethane prepolymer containing groups which are anionic and/or can be converted into anionic groups, and
   (Z.1.2) at least one polyamine containing two primary amino groups and one or two secondary amino groups.

5. The aqueous coating composition as claimed in claim 1, wherein the at least one anionically stabilized binder BM comprises at least one anionically stabilized polymer (asP) dispersed in water and having an average particle size of 100 to 500 nm, the preparation of the anionically stabilized polymer comprising the consecutive radical emulsion polymerization of three mixtures (A), (B), and (C) of olefinically unsaturated monomers, where
   the mixture (A) comprises at least 50 wt % of vinylaromatic monomers, and a polymer prepared from the mixture (A) possesses a glass transition temperature of 10 to 65° C.,
   the mixture (B) comprises at least one polyunsaturated monomer, and a polymer prepared from the mixture (B) possesses a glass transition temperature of −35 to 15° C., and
   the mixture (C) comprises at least one anionic monomer, and a polymer prepared from the mixture (C) possesses a glass transition temperature of −50 to 15° C.,
   and where
   i. first the mixture (A) is polymerized,
   ii. then the mixture (B) is polymerized in the presence of the polymer prepared under i., and
   iii. thereafter the mixture (C) is polymerized in the presence of the polymer prepared under ii.

6. The aqueous coating composition as claimed in claim 1, wherein the aqueous coating composition comprises the at least one polycarboxylic acid PC in a total amount of 0.1 to 5 wt %, based on the total weight of the coating composition.

7. The aqueous coating composition as claimed in claim 1, wherein the at least one solvent L is selected from water, alkoxy-$C_2$-$C_{10}$ alcohols, ketones, esters, amides, methylal, butylal, 1,3-dioxolane, glycerol formal, and mixtures thereof.

8. The aqueous coating composition as claimed in claim 1, wherein the aqueous coating composition comprises the at least one solvent L in a total amount of 0.3 to 30 wt % based on the total weight of the coating composition.

9. The aqueous coating composition as claimed in claim 2, wherein the at least one anionically stabilized binder BM at a pH of 8.0 has an electrophoretic mobility of −2.5 to −10 (μm/s)/(V/cm).

10. The aqueous coating composition as claimed in claim 3, wherein the at least one anionically stabilized binder BM is present in a total amount of 30 to 70 wt %.

11. The aqueous coating composition as claimed in claim 1, wherein the dicarboxylic acid has the general formula (I)

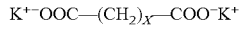
$$K^{+-}OOC\text{---}(CH_2)_x\text{---}COO^-K^+ \qquad 1.$$

in which
x stands for integers from 4 to 30.

12. The aqueous coating composition as claimed in claim 6, wherein the aqueous coating composition comprises the at least one polycarboxylic acid PC in a total amount of 0.25 to 4 wt %.

13. The aqueous coating composition as claimed in claim 8, wherein the aqueous coating composition comprises the at least one solvent L in a total amount of 1.5 to 30 wt %.

14. A method for producing a multicoat paint system (M) on a substrate (S), the method comprising:
(1) optionally producing a cured first coat (S1) on the substrate(S) by application of a composition (Z1) to the substrate(S) and subsequent curing of the composition (Z1),
(2) producing a basecoat (BL2a) or two or more directly consecutive basecoats (BL2-x) directly on the first coat (S1) by application of an aqueous basecoat material (bL2a) directly to the first coat (S1) or directly consecutive application of two or more aqueous basecoat materials (bL2-x) directly to the first coat (S1),
(3) producing a clearcoat (K) directly on the basecoat (BL2a) or on the topmost basecoat (BL2-z) by application of a clearcoat material (kL) directly to the basecoat (BL2a) or to the topmost basecoat (BL2-z), and
(4) jointly curing the basecoat (BL2a) and the clearcoat (K) or the basecoats (BL2-x) and the clearcoat (K), wherein
the at least one basecoat material (bL2a) or at least one of the basecoat materials (bL2-x) comprises the aqueous coating composition as claimed in claim 1.

15. A multicoat paint system obtainable by the method as claimed in claim 14.

16. The multicoat paint system as claimed in claim 15, wherein the surface of the multicoat paint system has a flop index of 11 to 30.

\* \* \* \* \*